US010581967B2

(12) United States Patent
Wood et al.

(10) Patent No.: US 10,581,967 B2
(45) Date of Patent: Mar. 3, 2020

(54) CHANDRA-TOUEG CONSENSUS IN A CONTENT CENTRIC NETWORK

(71) Applicant: Cisco Technology, Inc., San Jose, CA (US)

(72) Inventors: Christopher A. Wood, San Francisco, CA (US); Glenn C. Scott, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/245,833

(22) Filed: Jan. 11, 2019

(65) Prior Publication Data

US 2019/0149603 A1 May 16, 2019

Related U.S. Application Data

(62) Division of application No. 14/992,883, filed on Jan. 11, 2016, now Pat. No. 10,257,271.

(51) Int. Cl.
*H04L 29/08* (2006.01)
*H04L 29/06* (2006.01)
*H04L 29/14* (2006.01)

(52) U.S. Cl.
CPC .......... *H04L 67/1095* (2013.01); *H04L 63/08* (2013.01); *H04L 67/1097* (2013.01); *H04L 67/327* (2013.01); *H04L 69/40* (2013.01)

(58) Field of Classification Search
CPC ..... G06F 16/13; G06F 16/2272; G06Q 10/06; H04L 9/3236; H04L 9/3247;
(Continued)

(56) References Cited

U.S. PATENT DOCUMENTS 817,441 A 4/1906 Niesz
4,309,569 A 1/1982 Merkle
(Continued)

FOREIGN PATENT DOCUMENTS

CN 103873371 6/2014
DE 1720277 A1 6/1967
(Continued)

OTHER PUBLICATIONS

G. An, G. Kim and S. Lee, "Consensus-based information synchronization for content-centric networks," 2016 International Conference on Selected Topics in Mobile & Wireless Networking (MoWNeT)(MOWNET), Cairo, Egypt, 2016, pp. 1-2.
(Continued)

*Primary Examiner* — Clayton R Williams
*Assistant Examiner* — Michael Li

(57) ABSTRACT

One embodiment provides a system that facilitates secure communication between computing entities. During operation, the system generates a first interest that indicates a vote for a value associated with a group prefix and a round number. In response to the first interest, the system receives a first content object that indicates an acknowledgment of the vote and has a payload that includes a nonce validator. In response to a second interest that indicates an acknowledgment of the first content object, the system receives a second content object that indicates a decision for the value and has a payload that includes a nonce which is used as a pre-image of the nonce validator. The system verifies the second content object based on the nonce and the nonce validator.

20 Claims, 12 Drawing Sheets

(58) Field of Classification Search
CPC ..... H04L 45/7557; H04L 63/08; H04L 63/12; H04L 67/327; H04L 67/1095; H04L 67/1097; H04L 67/2842; H04L 69/40; H04L 69/329

See application file for complete search history.

(56) References Cited

U.S. PATENT DOCUMENTS

| | | |
|---|---|---|
| 4,921,898 A | 5/1990 | Lenney |
| 5,070,134 A | 12/1991 | Oyamada |
| 5,110,856 A | 5/1992 | Oyamada |
| 5,214,702 A | 5/1993 | Fischer |
| 5,377,354 A | 12/1994 | Scannell |
| 5,506,844 A | 4/1996 | Rao |
| 5,629,370 A | 5/1997 | Freidzon |
| 5,845,207 A | 12/1998 | Amin |
| 5,870,605 A | 2/1999 | Bracho |
| 6,021,464 A | 2/2000 | Yao |
| 6,047,331 A | 4/2000 | Medard |
| 6,052,683 A | 4/2000 | Irwin |
| 6,085,320 A | 7/2000 | Kaliski |
| 6,091,724 A | 7/2000 | Chandra |
| 6,128,623 A | 10/2000 | Mattis |
| 6,128,627 A | 10/2000 | Mattis |
| 6,173,364 B1 | 1/2001 | Zenchelsky |
| 6,209,003 B1 | 3/2001 | Mattis |
| 6,226,618 B1 | 5/2001 | Downs |
| 6,233,617 B1 | 5/2001 | Rothwein |
| 6,233,646 B1 | 5/2001 | Hahm |
| 6,289,358 B1 | 9/2001 | Mattis |
| 6,292,880 B1 | 9/2001 | Mattis |
| 6,332,158 B1 | 12/2001 | Risley |
| 6,363,067 B1 | 3/2002 | Chung |
| 6,366,988 B1 | 4/2002 | Skiba |
| 6,574,377 B1 | 6/2003 | Cahill |
| 6,654,792 B1 | 11/2003 | Verma |
| 6,667,957 B1 | 12/2003 | Corson |
| 6,681,220 B1 | 1/2004 | Kaplan |
| 6,681,326 B2 | 1/2004 | Son |
| 6,732,273 B1 | 5/2004 | Byers |
| 6,769,066 B1 | 7/2004 | Botros |
| 6,772,333 B1 | 8/2004 | Brendel |
| 6,775,258 B1 | 8/2004 | vanValkenburg |
| 6,834,272 B1 | 12/2004 | Naor |
| 6,862,280 B1 | 3/2005 | Bertagna |
| 6,901,452 B1 | 5/2005 | Bertagna |
| 6,915,307 B1 | 7/2005 | Mattis |
| 6,917,985 B2 | 7/2005 | Madruga |
| 6,957,228 B1 | 10/2005 | Graser |
| 6,968,393 B1 | 11/2005 | Chen |
| 6,981,029 B1 | 12/2005 | Menditto |
| 7,007,024 B2 | 2/2006 | Zelenka |
| 7,013,389 B1 | 3/2006 | Srivastava |
| 7,031,308 B2 | 4/2006 | Garcia-Luna-Aceves |
| 7,043,637 B2 | 5/2006 | Bolosky |
| 7,061,877 B1 | 6/2006 | Gummalla |
| 7,080,073 B1 | 7/2006 | Jiang |
| RE39,360 E | 10/2006 | Aziz |
| 7,149,750 B2 | 12/2006 | Chadwick |
| 7,152,094 B1 | 12/2006 | Jannu |
| 7,177,646 B2 | 2/2007 | ONeill |
| 7,206,860 B2 | 4/2007 | Murakami |
| 7,206,861 B1 | 4/2007 | Callon |
| 7,210,326 B2 | 5/2007 | Kawamoto |
| 7,233,948 B1 | 6/2007 | Shamoon |
| 7,246,159 B2 | 7/2007 | Aggarwal |
| 7,257,837 B2 | 8/2007 | Xu |
| 7,287,275 B2 | 10/2007 | Moskowitz |
| 7,315,541 B1 | 1/2008 | Housel |
| 7,339,929 B2 | 3/2008 | Zelig |
| 7,350,229 B1 | 3/2008 | Lander |
| 7,362,727 B1 | 4/2008 | ONeill |
| 7,382,787 B1 | 6/2008 | Barnes |
| 7,395,507 B2 | 7/2008 | Robarts |
| 7,430,755 B1 | 9/2008 | Hughes |
| 7,444,251 B2 | 10/2008 | Nikovski |
| 7,466,703 B1 | 12/2008 | Arunachalam |
| 7,472,422 B1 | 12/2008 | Agbabian |
| 7,496,668 B2 | 2/2009 | Hawkinson |
| 7,509,425 B1 | 3/2009 | Rosenberg |
| 7,523,016 B1 | 4/2009 | Surdulescu |
| 7,535,926 B1 | 5/2009 | Deshpande |
| 7,542,471 B2 | 6/2009 | Samuels |
| 7,543,064 B2 | 6/2009 | Juncker |
| 7,552,233 B2 | 6/2009 | Raju |
| 7,555,482 B2 | 6/2009 | Korkus |
| 7,555,563 B2 | 6/2009 | Ott |
| 7,564,812 B1 | 7/2009 | Elliott |
| 7,567,547 B2 | 7/2009 | Mosko |
| 7,567,946 B2 | 7/2009 | Andreoli |
| 7,580,971 B1 | 8/2009 | Gollapudi |
| 7,623,535 B2 | 11/2009 | Guichard |
| 7,636,767 B2 | 12/2009 | Lev-Ran |
| 7,647,507 B1 | 1/2010 | Feng |
| 7,660,324 B2 | 2/2010 | Oguchi |
| 7,685,290 B2 | 3/2010 | Satapati |
| 7,698,463 B2 | 4/2010 | Ogier |
| 7,698,559 B1 | 4/2010 | Chaudhury |
| 7,769,887 B1 | 8/2010 | Bhattacharyya |
| 7,779,467 B2 | 8/2010 | Choi |
| 7,801,069 B2 | 9/2010 | Cheung |
| 7,801,177 B2 | 9/2010 | Luss |
| 7,816,441 B2 | 10/2010 | Elizalde |
| 7,831,733 B2 | 11/2010 | Sultan |
| 7,873,619 B1 | 1/2011 | Faibish |
| 7,908,337 B2 | 3/2011 | Garcia-Luna-Aceves |
| 7,924,837 B1 | 4/2011 | Shabtay |
| 7,953,014 B2 | 5/2011 | Toda |
| 7,953,885 B1 | 5/2011 | Devi reddy |
| 7,979,912 B1 | 7/2011 | Roka |
| 8,000,267 B2 | 8/2011 | Solis |
| 8,010,691 B2 | 8/2011 | Kollmansberger |
| 8,069,023 B1 | 11/2011 | Frailong |
| 8,074,289 B1 | 12/2011 | Carpentier |
| 8,117,441 B2 | 2/2012 | Kurien |
| 8,160,069 B2 | 4/2012 | Jacobson |
| 8,204,060 B2 | 6/2012 | Jacobson |
| 8,214,364 B2 | 7/2012 | Bigus |
| 8,224,985 B2 | 7/2012 | Takeda |
| 8,225,057 B1 | 7/2012 | Zheng |
| 8,239,331 B2 | 8/2012 | Shanmugavelayutham |
| 8,271,578 B2 | 9/2012 | Sheffi |
| 8,271,687 B2 | 9/2012 | Turner |
| 8,312,064 B1 | 11/2012 | Gauvin |
| 8,332,357 B1 | 12/2012 | Chung |
| 8,375,420 B2 | 2/2013 | Farrell |
| 8,386,622 B2 | 2/2013 | Jacobson |
| 8,447,851 B1 | 5/2013 | Anderson |
| 8,462,781 B2 | 6/2013 | McGhee |
| 8,467,297 B2 | 6/2013 | Liu |
| 8,473,633 B2 | 6/2013 | Eardley |
| 8,553,562 B2 | 10/2013 | Allan |
| 8,572,214 B2 | 10/2013 | Garcia-Luna-Aceves |
| 8,654,649 B2 | 2/2014 | Vasseur |
| 8,665,757 B2 | 3/2014 | Kling |
| 8,667,172 B2 | 3/2014 | Ravindran |
| 8,677,451 B1 | 3/2014 | Bhimaraju |
| 8,688,619 B1 | 4/2014 | Ezick |
| 8,699,350 B1 | 4/2014 | Kumar |
| 8,718,055 B2 | 5/2014 | Vasseur |
| 8,750,820 B2 | 6/2014 | Allan |
| 8,761,022 B2 | 6/2014 | Chiabaut |
| 8,762,477 B2 | 6/2014 | Xie |
| 8,762,570 B2 | 6/2014 | Qian |
| 8,762,707 B2 | 6/2014 | Killian |
| 8,767,627 B2 | 7/2014 | Ezure |
| 8,817,594 B2 | 8/2014 | Gero |
| 8,826,381 B2 | 9/2014 | Kim |
| 8,832,302 B1 | 9/2014 | Bradford |
| 8,836,536 B2 | 9/2014 | Marwah |
| 8,861,356 B2 | 10/2014 | Kozat |
| 8,862,774 B2 | 10/2014 | Vasseur |
| 8,868,779 B2 | 10/2014 | ONeill |
| 8,874,842 B1 | 10/2014 | Kimmel |

(56) References Cited

U.S. PATENT DOCUMENTS

| | | |
|---|---|---|
| 8,880,682 B2 | 11/2014 | Bishop |
| 8,903,756 B2 | 12/2014 | Zhao |
| 8,923,293 B2 | 12/2014 | Jacobson |
| 8,934,496 B2 | 1/2015 | Vasseur |
| 8,937,865 B1 | 1/2015 | Kumar |
| 8,972,969 B2 | 3/2015 | Gaither |
| 8,977,596 B2 | 3/2015 | Montulli |
| 9,002,921 B2 | 4/2015 | Westphal |
| 9,032,095 B1 | 5/2015 | Traina |
| 9,071,498 B2 | 6/2015 | Beser |
| 9,112,895 B1 | 8/2015 | Lin |
| 9,137,152 B2 | 9/2015 | Xie |
| 9,253,087 B2 | 2/2016 | Zhang |
| 9,270,598 B1 | 2/2016 | Oran |
| 9,280,610 B2 | 3/2016 | Gruber |
| 2002/0002680 A1 | 1/2002 | Carbajal |
| 2002/0010795 A1 | 1/2002 | Brown |
| 2002/0038296 A1 | 3/2002 | Margolus |
| 2002/0048269 A1 | 4/2002 | Hong |
| 2002/0054593 A1 | 5/2002 | Morohashi |
| 2002/0077988 A1 | 6/2002 | Sasaki |
| 2002/0078066 A1 | 6/2002 | Robinson |
| 2002/0138551 A1 | 9/2002 | Erickson |
| 2002/0152305 A1 | 10/2002 | Jackson |
| 2002/0176404 A1 | 11/2002 | Girard |
| 2002/0188605 A1 | 12/2002 | Adya |
| 2002/0199014 A1 | 12/2002 | Yang |
| 2003/0004621 A1 | 1/2003 | Bousquet |
| 2003/0009365 A1 | 1/2003 | Tynan |
| 2003/0033394 A1 | 2/2003 | Stine |
| 2003/0046396 A1 | 3/2003 | Richter |
| 2003/0046421 A1 | 3/2003 | Horvitz et al. |
| 2003/0046437 A1 | 3/2003 | Eytchison |
| 2003/0048793 A1 | 3/2003 | Pochon |
| 2003/0051100 A1 | 3/2003 | Patel |
| 2003/0061384 A1 | 3/2003 | Nakatani |
| 2003/0074472 A1 | 4/2003 | Lucco |
| 2003/0088696 A1 | 5/2003 | McCanne |
| 2003/0097447 A1 | 5/2003 | Johnston |
| 2003/0099237 A1 | 5/2003 | Mitra |
| 2003/0140257 A1 | 7/2003 | Peterka |
| 2003/0229892 A1 | 12/2003 | Sardera |
| 2004/0024879 A1 | 2/2004 | Dingman |
| 2004/0030602 A1 | 2/2004 | Rosenquist |
| 2004/0064737 A1 | 4/2004 | Milliken |
| 2004/0071140 A1 | 4/2004 | Jason |
| 2004/0073617 A1 | 4/2004 | Milliken |
| 2004/0073715 A1 | 4/2004 | Folkes |
| 2004/0139230 A1 | 7/2004 | Kim |
| 2004/0196783 A1 | 10/2004 | Shinomiya |
| 2004/0218548 A1 | 11/2004 | Kennedy |
| 2004/0221047 A1 | 11/2004 | Grover |
| 2004/0225627 A1 | 11/2004 | Botros |
| 2004/0233916 A1 | 11/2004 | Takeuchi |
| 2004/0246902 A1 | 12/2004 | Weinstein |
| 2004/0252683 A1 | 12/2004 | Kennedy |
| 2004/0254984 A1 | 12/2004 | Dinker |
| 2004/0267902 A1 | 12/2004 | Yang |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0066121 A1 | 3/2005 | Keeler |
| 2005/0074001 A1 | 4/2005 | Mattes |
| 2005/0132207 A1 | 6/2005 | Mourad |
| 2005/0149508 A1 | 7/2005 | Deshpande |
| 2005/0159823 A1 | 7/2005 | Hayes |
| 2005/0198351 A1 | 9/2005 | Nog |
| 2005/0198359 A1* | 9/2005 | Basani ............ H04L 67/1095 709/232 |
| 2005/0249196 A1 | 11/2005 | Ansari |
| 2005/0259637 A1 | 11/2005 | Chu |
| 2005/0262217 A1 | 11/2005 | Nonaka |
| 2005/0281288 A1 | 12/2005 | Banerjee |
| 2005/0286535 A1 | 12/2005 | Shrum |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0146686 A1 | 7/2006 | Kim |
| 2006/0173831 A1 | 8/2006 | Basso |
| 2006/0193295 A1 | 8/2006 | White |
| 2006/0203804 A1 | 9/2006 | Whitmore |
| 2006/0206445 A1 | 9/2006 | Andreoli |
| 2006/0215684 A1 | 9/2006 | Capone |
| 2006/0223504 A1 | 10/2006 | Ishak |
| 2006/0242155 A1 | 10/2006 | Moore |
| 2006/0256767 A1 | 11/2006 | Suzuki |
| 2006/0268792 A1 | 11/2006 | Belcea |
| 2006/0288237 A1 | 12/2006 | Goodwill |
| 2007/0019619 A1 | 1/2007 | Foster |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0156998 A1 | 7/2007 | Gorobets |
| 2007/0160062 A1 | 7/2007 | Morishita |
| 2007/0162394 A1 | 7/2007 | Zager |
| 2007/0171828 A1 | 7/2007 | Dalal |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255677 A1 | 11/2007 | Alexander |
| 2007/0255699 A1 | 11/2007 | Sreenivas |
| 2007/0255781 A1 | 11/2007 | Li |
| 2007/0274504 A1 | 11/2007 | Maes |
| 2007/0275701 A1 | 11/2007 | Jonker |
| 2007/0276907 A1 | 11/2007 | Maes |
| 2007/0283158 A1 | 12/2007 | Danseglio |
| 2007/0294187 A1 | 12/2007 | Scherrer |
| 2008/0005056 A1 | 1/2008 | Stelzig |
| 2008/0005223 A1 | 1/2008 | Flake |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0082662 A1 | 4/2008 | Dandliker |
| 2008/0095159 A1 | 4/2008 | Suzuki |
| 2008/0101357 A1 | 5/2008 | Iovanna |
| 2008/0107034 A1 | 5/2008 | Jetcheva |
| 2008/0107259 A1 | 5/2008 | Satou |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0165775 A1 | 7/2008 | Das |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0250006 A1 | 10/2008 | Dettinger |
| 2008/0256138 A1 | 10/2008 | Sim-Tang |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0291923 A1 | 11/2008 | Back |
| 2008/0298376 A1 | 12/2008 | Takeda |

(56) References Cited

U.S. PATENT DOCUMENTS

| | | |
|---|---|---|
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0116393 A1 | 5/2009 | Hughes |
| 2009/0117922 A1 | 5/2009 | Bell |
| 2009/0132662 A1 | 5/2009 | Sheridan |
| 2009/0135728 A1 | 5/2009 | Shen |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0198832 A1 | 8/2009 | Shah |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0274158 A1 | 11/2009 | Sharp |
| 2009/0276396 A1 | 11/2009 | Gorman |
| 2009/0285209 A1 | 11/2009 | Stewart |
| 2009/0287835 A1 | 11/2009 | Jacobson |
| 2009/0287853 A1 | 11/2009 | Carson |
| 2009/0288076 A1 | 11/2009 | Johnson |
| 2009/0288143 A1 | 11/2009 | Stebila |
| 2009/0288163 A1 | 11/2009 | Jacobson |
| 2009/0292743 A1 | 11/2009 | Bigus |
| 2009/0293121 A1 | 11/2009 | Bigus |
| 2009/0296719 A1 | 12/2009 | Maier |
| 2009/0300079 A1 | 12/2009 | Shitomi |
| 2009/0300407 A1 | 12/2009 | Karnath |
| 2009/0300512 A1 | 12/2009 | Ahn |
| 2009/0307286 A1 | 12/2009 | Laffin |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0058346 A1 | 3/2010 | Narang |
| 2010/0088370 A1 | 4/2010 | Wu |
| 2010/0094767 A1 | 4/2010 | Miltonberger |
| 2010/0094876 A1 | 4/2010 | Huang |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0217985 A1 | 8/2010 | Fahrny |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0257149 A1 | 10/2010 | Cognigni |
| 2010/0268782 A1 | 10/2010 | Zombek |
| 2010/0272107 A1 | 10/2010 | Papp |
| 2010/0281263 A1 | 11/2010 | Ugawa |
| 2010/0284309 A1 | 11/2010 | Allan |
| 2010/0284404 A1 | 11/2010 | Gopinath |
| 2010/0293293 A1 | 11/2010 | Beser |
| 2010/0316052 A1 | 12/2010 | Petersen |
| 2010/0322249 A1 | 12/2010 | Thathapudi |
| 2010/0332595 A1 | 12/2010 | Fullagar |
| 2011/0013637 A1 | 1/2011 | Xue |
| 2011/0019674 A1 | 1/2011 | Iovanna |
| 2011/0022812 A1 | 1/2011 | vanderlinden |
| 2011/0029952 A1 | 2/2011 | Harrington |
| 2011/0055392 A1 | 3/2011 | Shen |
| 2011/0055921 A1 | 3/2011 | Narayanaswamy |
| 2011/0060716 A1 | 3/2011 | Forman |
| 2011/0060717 A1 | 3/2011 | Forman |
| 2011/0090908 A1 | 4/2011 | Jacobson |
| 2011/0106755 A1 | 5/2011 | Hao |
| 2011/0131308 A1 | 6/2011 | Eriksson |
| 2011/0137919 A1 | 6/2011 | Ryu |
| 2011/0145597 A1 | 6/2011 | Yamaguchi |
| 2011/0145858 A1 | 6/2011 | Philpott |
| 2011/0149858 A1 | 6/2011 | Hwang |
| 2011/0153840 A1 | 6/2011 | Narayana |
| 2011/0158122 A1 | 6/2011 | Murphy |
| 2011/0161408 A1 | 6/2011 | Kim |
| 2011/0202609 A1 | 8/2011 | Chaturvedi |
| 2011/0219093 A1 | 9/2011 | Ragunathan |
| 2011/0219427 A1 | 9/2011 | Hito |
| 2011/0219727 A1 | 9/2011 | May |
| 2011/0225293 A1 | 9/2011 | Rathod |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265159 A1 | 10/2011 | Ronda |
| 2011/0265174 A1 | 10/2011 | Thornton |
| 2011/0271007 A1 | 11/2011 | Wang |
| 2011/0280214 A1 | 11/2011 | Lee |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0023113 A1 | 1/2012 | Ferren |
| 2012/0036180 A1 | 2/2012 | Thornton |
| 2012/0045064 A1 | 2/2012 | Rembarz |
| 2012/0047361 A1 | 2/2012 | Erdmann |
| 2012/0066727 A1 | 3/2012 | Nozoe |
| 2012/0079056 A1 | 3/2012 | TurAjnyi |
| 2012/0102136 A1 | 4/2012 | Srebrny |
| 2012/0106339 A1 | 5/2012 | Mishra |
| 2012/0110159 A1 | 5/2012 | Richardson |
| 2012/0114313 A1 | 5/2012 | Phillips |
| 2012/0120803 A1 | 5/2012 | Farkas |
| 2012/0127994 A1 | 5/2012 | Ko |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0166433 A1 | 6/2012 | Tseng |
| 2012/0170913 A1 | 7/2012 | Isozaki |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0226902 A1 | 9/2012 | Kim |
| 2012/0257500 A1 | 10/2012 | Lynch |
| 2012/0284791 A1 | 11/2012 | Miller |
| 2012/0290669 A1 | 11/2012 | Parks |

(56) References Cited

U.S. PATENT DOCUMENTS

| | | | |
|---|---|---|---|
| 2012/0290919 A1 | 11/2012 | Melnyk | |
| 2012/0291102 A1 | 11/2012 | Cohen | |
| 2012/0300669 A1 | 11/2012 | Zahavi | |
| 2012/0303631 A1* | 11/2012 | Bird | G06F 16/2272 707/741 |
| 2012/0307629 A1 | 12/2012 | Vasseur | |
| 2012/0314580 A1 | 12/2012 | Hong | |
| 2012/0317307 A1 | 12/2012 | Ravindran | |
| 2012/0317655 A1 | 12/2012 | Zhang | |
| 2012/0322422 A1 | 12/2012 | Frecks | |
| 2012/0323933 A1 | 12/2012 | He | |
| 2012/0331112 A1 | 12/2012 | Chatani | |
| 2013/0024560 A1 | 1/2013 | Vasseur | |
| 2013/0041982 A1 | 2/2013 | Shi | |
| 2013/0051392 A1 | 2/2013 | Filsfils | |
| 2013/0054971 A1 | 2/2013 | Yamaguchi | |
| 2013/0060962 A1 | 3/2013 | Wang | |
| 2013/0061084 A1 | 3/2013 | Barton | |
| 2013/0066823 A1 | 3/2013 | Sweeney | |
| 2013/0073552 A1 | 3/2013 | Rangwala | |
| 2013/0073882 A1 | 3/2013 | Inbaraj | |
| 2013/0074155 A1 | 3/2013 | Huh | |
| 2013/0090942 A1 | 4/2013 | Robinson | |
| 2013/0091237 A1 | 4/2013 | Ambalavanar | |
| 2013/0091539 A1 | 4/2013 | Khurana | |
| 2013/0110987 A1 | 5/2013 | Kim | |
| 2013/0111063 A1 | 5/2013 | Lee | |
| 2013/0128786 A1 | 5/2013 | Sultan | |
| 2013/0132719 A1 | 5/2013 | Kobayashi | |
| 2013/0139245 A1 | 5/2013 | Thomas | |
| 2013/0151584 A1 | 6/2013 | Westphal | |
| 2013/0151646 A1 | 6/2013 | Chidambaram | |
| 2013/0152070 A1 | 6/2013 | Bhullar | |
| 2013/0163426 A1 | 6/2013 | Beliveau | |
| 2013/0166668 A1 | 6/2013 | Byun | |
| 2013/0173822 A1 | 7/2013 | Hong | |
| 2013/0182568 A1 | 7/2013 | Lee | |
| 2013/0182931 A1 | 7/2013 | Fan | |
| 2013/0185406 A1 | 7/2013 | Choi | |
| 2013/0191412 A1 | 7/2013 | Kitamura | |
| 2013/0197698 A1 | 8/2013 | Shah | |
| 2013/0198119 A1 | 8/2013 | Eberhardt, III | |
| 2013/0212185 A1 | 8/2013 | Pasquero | |
| 2013/0219038 A1 | 8/2013 | Lee | |
| 2013/0219081 A1 | 8/2013 | Qian | |
| 2013/0219478 A1 | 8/2013 | Mahamuni | |
| 2013/0223237 A1 | 8/2013 | Hui | |
| 2013/0227048 A1 | 8/2013 | Xie | |
| 2013/0227114 A1 | 8/2013 | Vasseur | |
| 2013/0227166 A1 | 8/2013 | Ravindran | |
| 2013/0242996 A1 | 9/2013 | Varvello | |
| 2013/0250809 A1 | 9/2013 | Hui | |
| 2013/0262365 A1 | 10/2013 | Dolbear | |
| 2013/0262698 A1 | 10/2013 | Schwan | |
| 2013/0275544 A1 | 10/2013 | Westphal | |
| 2013/0282854 A1 | 10/2013 | Jang | |
| 2013/0282860 A1 | 10/2013 | Zhang | |
| 2013/0282920 A1 | 10/2013 | Zhang | |
| 2013/0304758 A1 | 11/2013 | Gruber | |
| 2013/0304937 A1 | 11/2013 | Lee | |
| 2013/0325888 A1 | 12/2013 | Oneppo | |
| 2013/0329696 A1 | 12/2013 | Xu | |
| 2013/0332971 A1 | 12/2013 | Fisher | |
| 2013/0336103 A1 | 12/2013 | Vasseur | |
| 2013/0336323 A1 | 12/2013 | Srinivasan | |
| 2013/0339481 A1 | 12/2013 | Hong | |
| 2013/0343408 A1 | 12/2013 | Cook | |
| 2014/0003232 A1 | 1/2014 | Guichard | |
| 2014/0003424 A1 | 1/2014 | Matsuhira | |
| 2014/0006354 A1 | 1/2014 | Parkison | |
| 2014/0006565 A1 | 1/2014 | Muscariello | |
| 2014/0029445 A1 | 1/2014 | Hui | |
| 2014/0032714 A1 | 1/2014 | Liu | |
| 2014/0033193 A1 | 1/2014 | Palaniappan | |
| 2014/0040505 A1 | 2/2014 | Barton | |
| 2014/0040628 A1 | 2/2014 | Fort | |
| 2014/0043987 A1 | 2/2014 | Watve | |
| 2014/0047513 A1 | 2/2014 | vantNoordende | |
| 2014/0074730 A1 | 3/2014 | Arensmeier | |
| 2014/0075567 A1 | 3/2014 | Raleigh | |
| 2014/0082135 A1 | 3/2014 | Jung | |
| 2014/0082661 A1 | 3/2014 | Krahnstoever | |
| 2014/0089454 A1 | 3/2014 | Jeon | |
| 2014/0096249 A1 | 4/2014 | Dupont | |
| 2014/0098685 A1 | 4/2014 | Shattil | |
| 2014/0108313 A1 | 4/2014 | Heidasch | |
| 2014/0108474 A1 | 4/2014 | David | |
| 2014/0115037 A1 | 4/2014 | Liu | |
| 2014/0122587 A1 | 5/2014 | Petker et al. | |
| 2014/0129736 A1 | 5/2014 | Yu | |
| 2014/0136814 A1 | 5/2014 | Stark | |
| 2014/0140348 A1 | 5/2014 | Perlman | |
| 2014/0143370 A1 | 5/2014 | Vilenski | |
| 2014/0146819 A1 | 5/2014 | Bae | |
| 2014/0149733 A1 | 5/2014 | Kim | |
| 2014/0237095 A1 | 5/2014 | Petker | |
| 2014/0156396 A1 | 6/2014 | deKozan | |
| 2014/0165207 A1 | 6/2014 | Engel | |
| 2014/0172783 A1 | 6/2014 | Suzuki | |
| 2014/0172981 A1 | 6/2014 | Kim | |
| 2014/0173034 A1 | 6/2014 | Liu | |
| 2014/0173076 A1 | 6/2014 | Ravindran | |
| 2014/0181140 A1 | 6/2014 | Kim | |
| 2014/0192677 A1 | 7/2014 | Chew | |
| 2014/0192717 A1 | 7/2014 | Liu | |
| 2014/0195328 A1 | 7/2014 | Ferens | |
| 2014/0195641 A1 | 7/2014 | Wang | |
| 2014/0195666 A1 | 7/2014 | Dumitriu | |
| 2014/0204945 A1 | 7/2014 | Byun | |
| 2014/0214942 A1 | 7/2014 | Ozonat | |
| 2014/0233575 A1 | 8/2014 | Xie | |
| 2014/0237085 A1 | 8/2014 | Park | |
| 2014/0245359 A1 | 8/2014 | DeFoy | |
| 2014/0254595 A1 | 9/2014 | Luo | |
| 2014/0280823 A1 | 9/2014 | Varvello | |
| 2014/0281489 A1 | 9/2014 | Peterka | |
| 2014/0281505 A1 | 9/2014 | Zhang | |
| 2014/0282816 A1 | 9/2014 | Xie | |
| 2014/0289325 A1* | 9/2014 | Solis | H04L 67/327 709/204 |
| 2014/0289790 A1 | 9/2014 | Wilson | |
| 2014/0298248 A1 | 10/2014 | Kang | |
| 2014/0314093 A1 | 10/2014 | You | |
| 2014/0337276 A1 | 11/2014 | Iordanov | |
| 2014/0365550 A1 | 12/2014 | Jang | |
| 2015/0006896 A1 | 1/2015 | Franck | |
| 2015/0018770 A1 | 1/2015 | Baran | |
| 2015/0032892 A1 | 1/2015 | Narayanan | |
| 2015/0033365 A1 | 1/2015 | Mellor | |
| 2015/0039890 A1 | 2/2015 | Khosravi | |
| 2015/0063802 A1 | 3/2015 | Bahadur | |
| 2015/0089081 A1 | 3/2015 | Thubert | |
| 2015/0095481 A1 | 4/2015 | Ohnishi | |
| 2015/0095514 A1 | 4/2015 | Yu | |
| 2015/0120663 A1 | 4/2015 | LeScouarnec | |
| 2015/0169758 A1 | 6/2015 | Assom | |
| 2015/0188770 A1 | 7/2015 | Naiksatam | |
| 2015/0195149 A1 | 7/2015 | Vasseur | |
| 2015/0207633 A1 | 7/2015 | Ravindran | |
| 2015/0207864 A1 | 7/2015 | Wilson | |
| 2015/0279348 A1 | 10/2015 | Cao | |
| 2015/0288755 A1 | 10/2015 | Mosko | |
| 2015/0312300 A1 | 10/2015 | Mosko | |
| 2015/0341175 A1* | 11/2015 | Mosko | H04L 63/12 713/167 |
| 2015/0349961 A1 | 12/2015 | Mosko | |
| 2015/0372903 A1 | 12/2015 | Hui | |
| 2015/0381546 A1 | 12/2015 | Mahadevan | |
| 2016/0019275 A1 | 1/2016 | Mosko | |
| 2016/0021172 A1 | 1/2016 | Mahadevan | |
| 2016/0062840 A1 | 3/2016 | Scott | |
| 2016/0110466 A1 | 4/2016 | Uzun | |

(56) References Cited

U.S. PATENT DOCUMENTS

| | | |
|---|---|---|
| 2016/0171184 A1 | 6/2016 | Solis |
| 2017/0142226 A1 | 5/2017 | De Foy et al. |
| 2017/0201577 A1 | 7/2017 | Wood et al. |

FOREIGN PATENT DOCUMENTS

| | | |
|---|---|---|
| DE | 19620817 A1 | 11/1997 |
| EP | 0295727 A2 | 12/1988 |
| EP | 0757065 A2 | 7/1996 |
| EP | 1077422 A2 | 2/2001 |
| EP | 1383265 A1 | 1/2004 |
| EP | 1384729 A1 | 1/2004 |
| EP | 1473889 A2 | 11/2004 |
| EP | 2120402 | 11/2009 |
| EP | 2120419 | 11/2009 |
| EP | 2120419 A2 | 11/2009 |
| EP | 2124415 A2 | 11/2009 |
| EP | 2214357 A1 | 8/2010 |
| EP | 2299754 A1 | 3/2011 |
| EP | 2323346 | 5/2011 |
| EP | 2552083 | 1/2013 |
| EP | 2869536 A1 | 5/2015 |
| EP | 2214356 | 5/2016 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2005041527 | 5/2005 |
| WO | 2007113180 A1 | 10/2007 |
| WO | 2007122620 | 11/2007 |
| WO | 2007144388 A1 | 12/2007 |
| WO | 2011049890 A1 | 4/2011 |
| WO | 2012077073 A1 | 6/2012 |
| WO | 2013123410 | 8/2013 |
| WO | 2014023072 | 2/2014 |
| WO | 2015084327 | 6/2015 |

OTHER PUBLICATIONS

International Search Report and Written Opinion in corresponding International Application No. PCT/US2017/013039, dated Mar. 29, 2017, 9 pages.

Marc Mosko: "CCNx 1.0 Protocol Introduction" Apr. 2, 2014 [Retrieved from the Internet Jun. 8, 2016] http://www.ccnx.org/pubs/hhg/1.1%20CCNx%201.0%20Protocol%20Introduction.pdf *paragraphs [01.3], [002], [02.1], [0003].

Akash Baid et al: "Comparing alternative approaches for networking of named objects in the future Internet", Computer Communications Workshops (Infocom Wkshps), 2012 IEEE Conference on, IEEE, Mar. 2, 2012, pp. 298-303, *Paragraph [002]* *figure 1*.

Priya Mahadevan: "CCNx 1.0 Tutorial", Mar. 16, 2014, pp. 1-11, Retrieved from the Internet: http://www.ccnx.org/pubs/hhg/1.2%20CCNx%201.0%20Tutorial.pdf [retrieved on Jun. 8, 2016] *paragraphs [003]-[006], [0011], [0013]* figures 17.

Marc Mosko et al "All-In-One Streams for Content Centric Networks", May 24, 2015, retrieved from the Internet: http://www.ccnx.org/pubs/AllinOne.pdf [downloaded Jun. 9, 2016] *the whole document*.

Cesar Ghali et al. "Elements of Trust h Named-Data Networking", Feb. 13, 2014 Retrieved from the Internet Jun. 17, 2016 http://arxiv.org/pdf/1402.3332v5.pdf *p. 5 col. 1* *p. 2 col. 12* * Section 4.1; p. 4, col. 7 *Section 4.2; p. 4, col. 7.

Priya Mahadevan et al. "CCN-KRS", Proceedings of the 1st International Conference on Information-Centric Networking, Inc. '14, Sep. 24, 2014.

Flavia Roberto Santos Et al. "Funnel: Choking Polluters in BitTorrent File Sharing Communities", IEEE Transactions on Network and Service Management, IEEE vol. 8, No. 4, Dec. 1, 2011.

Liu Wai-Xi et al: "Multisource Dissemination in content-centric networking", 2013 Fourth International conference on the network of the future (NOF), IEEE, Oct. 23, 2013, pp. 1-5.

Marie-Jose Montpetit et al.: "Network coding meets information-centric networking", Proceedings of the 1st ACM Workshop on emerging Name-Oriented mobile networking design, architecture, algorithms, and applications, NOM '12, Jun. 11, 2012, pp. 31-36.

Asokan et al.: "Server-Supported Signatures", Computer Security Esorics 96, Sep. 25, 1996, pp. 131-143, Section 3.

Mandi et al.: "A Fast FPGA Based Coprocessor Supporting Hard Real-Time Search", New Frontiers of Information Technology, Proceedings of the 23rd Euromicro Conference Budapest, Sep. 1, 1997, pp. 499-506 *The Whole Document*.

Sun et al.: "Content-Based Route Lookup Using CAMs", Global Communications Conference, IEEE, Dec. 3, 2012 *The Whole Document*.

Gelenbe et al.: "Networks With Cognitive Packets", Modeling, Analysis and Simulation of Computer and Telecommunication Systems, 2000. IEEE, Aug. 29, 2000, pp. 3-1 O.

Vangelis et al: "On the Role of Semantic Descriptions for Adaptable Protocol Stacks in the Internet of Things" 2014 28th International Conference on Advanced Information Networking and Applications Workshops, IEEE, May 13, 2014, pp. 437-443, *last paragraph of section 11B*.

Smetters et al. "Securing Network Content" Technical Report, PARC TR-2009-1, Oct. 1, 2009, Retrieved from the internet URL:http//www.parc.com/content/attachments/TR-2009-01.pdf [retrieved Nov. 1, 2016].

Marc Mosko "CCNx Label Forwarding (CCNLF)" Jul. 21, 2014.

Gallo Alcatel-Lucent Bell Labs "Content-Centric Networking Packet Header Format" Jan. 26, 2015.

Huard J-F et al. "A Programmable Transport Architecture with QOS Guarantees" IEEE Communications Magazine, vol. 36, No. 10, Oct. 1, 1998.

Microsoft Computer Dictionary, Fifth Edition, 2002, Microsoft Press, p. 23.

Mind—A Brief Introduction, John R Searle, 2004, Oxford University Press, pp. 62-67.

Jacobson, Van et al., "Content-Centric Networking, Whitepaper Describing Future Assurable Global Networks", Palo Alto Research Center, Inc., Jan. 30, 2007, pp. 1-9.

Koponen, Teemu et al., "A Data-Oriented (and Beyond) Network Architecture", SIGCOMM '07, Aug. 27-31, 2007, Kyoto, Japan, XP-002579021, p. 181-192.

Jacobson, Van et al. 'VoCCN: Voice Over Content-Centric Networks.' Dec. 1, 2009. ACM ReArch'09.

Rosenberg, J. "Interactive Connectivity Establishment (ICE): A Protocol for Network Address Translator (NAT) Traversal for Offer/Answer Protocols", Apr. 2010, pp. 1-117.

Shih, Eugene et al., 'Wake on Wireless: An Event Driven Energy Saving Strategy for Battery Operated Devices', Sep. 23, 2002, pp. 160-171.

Fall, K. et al., "DTN: an architectural retrospective", Selected areas in communications, IEEE Journal on, vol. 28, No. 5, Jun. 1, 2008, pp. 828-835.

Gritter, M. et al., 'An Architecture for content routing support in the Internet', Proceedings of 3rd Usenix Symposium on Internet Technologies and Systems, 2001, pp. 37-48.

"CCNx," http://ccnx.org/. downloaded Mar. 11, 2015.

"Content Delivery Network", Wikipedia, Dec. 10, 2011, http://en.wikipedia.org/w/index.php?title=Content_delivery_network&oldid=465077460.

"Digital Signature" archived on Aug. 31, 2009 at http://web.archive.org/web/20090831170721/http://en.wikipedia.org/wiki/Digital_signature.

"Introducing JSON," http://www.json.org/. downloaded Mar. 11, 2015.

"Microsoft PlayReady," http://www.microsoft.com/playready/. downloaded Mar. 11, 2015.

"Pursuing a pub/sub internet (PURSUIT)," http://www.fp7-pursuit.ew/PursuitWeb/. downloaded Mar. 11, 2015.

"The FP7 4WARD project," http://www.4ward-project.eu/. downloaded Mar. 11, 2015.

A. Broder and A. Karlin, "Multilevel Adaptive Hashing", Jan. 1990, pp. 43-53.

(56) References Cited

OTHER PUBLICATIONS

Detti, Andrea, et al. "CON ET: a content centric inter-networking architecture." Proceedings of the ACM SIGCOMM workshop on Information-centric networking. ACM, 2011.

A. Wolman, M. Voelker, N. Sharman. Cardwell, A. Karlin, and H.M. Levy, "On the scale and performance of cooperative web proxy caching," ACM SIGHOPS Operating Systems Review, vol. 33, No. 5 pp. 16-31, Dec. 1999.

Afanasyev, Alexander, et al. "Interest flooding attack and countermeasures in Named Data Networking." IFIP Networking Conference, 2013. IEEE, 2013.

Ao-Jan Su, David R. Choffnes, Aleksandar Kuzmanovic, and Fabian E. Bustamante. Drafting Behind Akamai: Inferring Network Conditions Based on Con Redirections. IEEE/ACM Transactions on Networking {Feb. 2009).

B. Ahlgren et al., 'A Survey of Information-centric Networking' IEEE Commun. Magazine, Jul. 2012, pp. 26-36.

"PBC Library-Pairing-Based Cryptography-About," http://crypto.stanford.edu/pbc. downloaded Apr. 27, 2015.

Bari, MdFaizul, et al. 'A survey of naming and routing in information-centric networks.' Communications Magazine, IEEE 50.12 (2012): 44-53.

Baugher, Mark et al., "Self-Verifying Names for Read-Only Named Data", 2012 IEEE Conference on Computer Communications Workshops (INFOCOM WKSHPS), Mar. 2012, pp. 274-279.

Brambley, Michael, A novel, low-cost, reduced-sensor approach for providing smart remote monitoring and diagnostics for packaged air conditioners and heat pumps. Pacific Northwest National Laboratory, 2009.

C. Gentry and A. Silverberg. Hierarchical ID-Based Cryptography. Advances in Cryptology—ASIACRYPT 2002. Springer Berlin Heidelberg (2002).

C.A. Wood and E. Uzun, "Flexible end-to-end content security in CCN," in Proc. IEEE CCNC 2014, Las Vegas, CA, USA, Jan. 2014.

Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2 IEEE, 2004.

Cho, Jin-Hee, Ananthram Swami, and Ray Chen. "A survey on trust management for mobile ad hoc networks." Communications Surveys & Tutorials, IEEE 13.4 (2011): 562-583.

Compagno, Alberto, et al. "Poseidon: Mitigating interest flooding DDoS attacks ii named data networking." Local Computer Networks (LCN), 2013 IEEE 38th Conference on. IEEE, 2013.

Conner, William, et al. "A trust management framework for service-oriented environments." Proceedings of the 18th international conference on World wide ◆eb. ACM, 2009.

Content Centric Networking Project (CCN) [online], http://ccnx.org/releases/latest/doc/technical/, Downloaded Mar. 9, 2015.

Content Mediator Architecture for Content-aware Networks (COMET) Project [online], http://www.comet-project.org/, Downloaded Mar. 9, 2015.

Boneh et al., "Collusion Resistant Broadcast Encryption With Short Ciphertexts and Private Keys", 2005.

D. Boneh and M. Franklin. Identity-Based Encryption from the Weil Pairing. Advances in Cryptology—CRYPTO 2001, vol. 2139, Springer Berlin Heidelberg (2001).

D.K. Smetters, P. Golle, and J.D. Thornton, "CCNx access control specifications," PARC, Tech. Rep., Jul. 2010.

Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.

Detti et al., "Supporting the Web with an information centric network that routes by name", Aug. 2012, Computer Networks 56, pp. 3705-3702.

Dijkstra, Edsger W., and Carel S. Scholten. 'Termination detection for diffusing computations.' Information Processing Letters 11.1 (1980): 1-4.

Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.

E Rescorla and N. Modadugu, "Datagram transport layer security," IETF RFC 4347, Apr. 2006.

E.W. Dijkstra, W. Feijen, and A.J.M. Van Gasteren, "Derivation of a Termination Detection Algorithm for Distributed Computations," Information Processing Letter, vol. 16, No. 5, 1983.

Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.

Anteniese et al., "Improved Proxy Re-Encryption Schemes with Applications to Secure Distributed Storage", 2006.

G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.

G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.

G. Xylomenos et al., "A Survey of Information-centric Networking Research," IEEE Communication Surveys and Tutorials, Jul. 2013.

Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.

Garcia-Luna-Aceves, Jose J. 'A unified approach to loop-free routing using distance vectors or link states.' ACM SIGCOMM Computer Communication Review. vol. 19. No. 4. ACM, 1989.

Garcia-Luna-Aceves, Jose J. 'Name-Based Content Routing in Information Centric Networks Using Distance Information' Proc ACM ICN 2014, Sep. 2014.

Ghali, Cesar, GeneTsudik, and Ersin Uzun. "Needle in a Haystack: Mitigating Content Poisoning in Named-Data Networking." Proceedings of NOSS Workshop on Security of Emerging Networking Technologies (SENT). 2014.

Ghodsi, Ali, et al. "Information-centric networking: seeing the forest for the trees." Proceedings of the 10th ACM Workshop on Hot Topics in Networks. ACM, 2011.

Ghodsi, Ali, et al. "Naming in content-oriented architectures." Proceedings of the ACM SIGCOMM workshop on Information-centric networking. ACM, 2011.

Gupta, Anjali, Barbara Liskov, and Rodrigo Rodrigues. "Efficient Routing for Peer-to-Peer Overlays." NSDI. vol. 4. 2004.

Xiong et al., "CloudSeal: End-to-End Content Protection in Cloud-based Storage and Delivery Services", 2012.

Heckerman, David, John S. Breese, and Koos Rommelse. "Decision-Theoretic Troubleshooting." Communications of the ACM. 1995.

Heinemeier, Kristin, et al. "Uncertainties in Achieving Energy Savings from HVAC Maintenance Measures in the Field." ASHRAE Transactions 118.Part 2 {2012).

Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pd! (retrieved on Mar. 9, 2012).

Hoque et al., 'NLSR: Named-data Link State Routing Protocol', Aug. 12, 2013, ICN 2013, pp. 15-20.

https://code.google.com/p/ccnx-trace/.

I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.

Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.

J. Aumasson and D. Bernstein, "SipHash: a fast short-input PRF", Sep. 18, 2012.

(56) References Cited

OTHER PUBLICATIONS

J. Bethencourt, A, Sahai, and B. Waters, 'Ciphertext-policy attribute-based encryption,' in Proc. IEEE Security & Privacy 2007, Berkeley, CA, USA, May 2007, pp. 321-334.
J. Hur, "Improving security and efficiency in attribute-based data sharing," IEEE Trans. Knowledge Data Eng., vol. 25, No. 10, pp. 2271-2282, Oct. 2013.
J. Shao and Z. Cao. CCA-Secure Proxy Re-Encryption without Pairings. Public Key Cryptography. Springer Lecture Notes in Computer Science vol. 5443 (2009).
V. Jacobson et al., 'Networking Named Content,' Proc. IEEE CoNEXT '09, Dec. 2009.
Jacobson et al., "Custodian-Based Information Sharing," Jul. 2012, IEEE Communications Magazine: vol. 50 Issue 7 (p. 3843).
Ji, Kun, et al. "Prognostics enabled resilient control for model-based building automation systems." Proceedings of the 12th Conference of International Building Performance Simulation Association. 2011.
K. Liang, L. Fang, W. Susilo, and D.S. Wong, "A Ciphertext-policy attribute-based proxy re-encryppttion with chosen-ciphertext security," in Proc. INCoS 2013, Xian, China, Sep. 2013, pp. 52-559.
Katipamula, Srinivas, and Michael R. Brambley. "Review article: methods for fault detection, diagnostics, and prognostics for building systemsa review, Part I." HVAC&R Research 11.1 (2005): 3-25.
Katipamula, Srinivas, and Michael R. Brambley. "Review article: methods for fault detection, diagnostics, and prognostics for building systemsa review, Part II." HVAC&R Research 11.2 (2005): 169-187.
L. Wang et al., 'OSPFN: An OSPF Based Routing Protocol for Named Data Networking,' Technical Report NDN-0003, 2012.
L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.
Li, Wenjia, Anupam Joshi, and Tim Finin. "Coping with node misbehaviors in ad hoc networks: A multi-dimensional trust management approach." Mobile Data Management (MOM), 2010 Eleventh International Conference on. IEEE, 2010.
Lopez, Javier, et al. "Trust management systems for wireless sensor networks: Best practices." Computer Communications 33.9 (201 0): 1086-1093.
Gopal et al. "Integrating content-based Mechanisms with hierarchical File systems", Feb. 1999, University of Arizona, 15 pages.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "PKCS#12: Personal information exchange syntax v. 1.1," IETF RFC 7292, K. Moriarty, Ed., Jul. 2014.
M. Parsa and J.J. Garcia-Luna-Aceves, "A Protocol for Scalable Loop-free Multicast Routing." IEEE JSAC, Apr. 1997.
M. Walfish, H. Balakrishnan, and S. Shenker, "Untangling the web from DNS," in Proc. USENIX NSDI 2004, Oct. 2010, pp. 735-737.
Mahadevan, Priya, et al. "Orbis: rescaling degree correlations to generate annotated internet topologies." ACM SIGCOMM Computer Communication Review. vol. 37. No. 4. ACM, 2007.
Mahadevan, Priya, et al. "Systematic topology analysis and generation using degree correlations." ACM SIGCOMM Computer Communication Review. vol. 36. No. 4. ACM, 2006.
Matocha, Jeff, and Tracy Camp. 'A taxonomy of distributed termination detection algorithms.' Journal of Systems and Software 43.3 (1998): 207-221.
Matted Varvello et al., "Caesar: A Content Router for High Speed Forwarding", ICN 2012, Second Edition on Information-Centric Networking, New York, Aug. 2012.

McWilliams, Jennifer A., and Iain S. Walker. "Home Energy Article: A Systems Approach to Retrofitting Residential HVAC Systems." Lawrence Berkeley National Laboratory (2005).
Merindol et al., "An efficient algorithm to enable path diversity in link state routing networks", Jan. 10, Computer Networks 55 (2011), pp. 1132-1140.
Mobility First Project [online], http://mobilityfirst.winlab.rutgers.edu/, Downloaded Mar. 9, 2015.
Narasimhan, Sriram, and Lee Brownston. "HyDE-A General Framework for Stochastic and Hybrid Modelbased Diagnosis." Proc. DX 7 (2007): 162-169.
NON Project [online], http://www.named-data.net/, Downloaded Mar. 9, 2015.
Omar, Mawloud, Yadne Challal, and Abdelmadjid Bouabdallah. "Certification-based trust models in mobile ad hoc networks: A survey and taxonomy." Journal of Network and Computer Applications 35.1 (2012): 268-286.
P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.
R H. Deng, J. Weng, S. Liu, and K. Chen. Chosen-Ciphertext Secure Proxy Re-Encryption without Pairings. CANS. Spring Lecture Notes in Computer Science vol. 5339 (2008).
S. Chow, J. Weng, Y. Yang, and R. Deng. Efficient Unidirectional Proxy Re-Encryption. Progress in Cryptology—AFRICACRYPT 2010. Springer Berlin Heidelberg (2010).
S. Deering, "Multicast Routing in Internetworks and Extended LANs," Proc. ACM SIGCOMM '88, Aug. 1988.
S. Deering et al., "The PIM architecture for wide-area multicast routing," IEEE/ACM Trans, on Networking, vol. 4, No. 2, Apr. 1996.
S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. Maid, "Secure content delivery in information-centric networks: Design, implementation, and analyses," in Proc. ACM SIGCOMM ICN 2013, Hong Kong, China, Aug. 2013, pp. 73-78.
S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Sandvine, Global Internet Phenomena Report—Spring 2012. Located online at http://N\IWW.sandvine.com/downloads/ documents/ Phenomenal H2012/Sandyine Global Internet Phenomena Report 1H 2012.pdf.
Scalable and Adaptive Internet Solutions (SAIL) Project [online], http://sail-project.eu/ Downloaded Mar. 9, 2015.
Schein, Jeffrey, and Steven T. Bushby. A Simulation Study of a Hierarchical, Rule-Based Method for System-Level Fault Detection and Diagnostics in HVAC Systems. LS Department of Commerce,[Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.

(56) References Cited

OTHER PUBLICATIONS

Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246,2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.
The Despotify Project (2012). Available online at http://despotify.sourceforge.net/.
V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
V. K. Adhikari, S. Jain, Y. Chen, and Z.-L. Zhang. Vivisecting Youtube:An Active Measurement Study. In INFOCOM12 Miniconference (2012).
Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.
Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CON Movie Delivery. In the Proceedings of IEEE INFOCOM 2012 (2012).
Vutukury, Srinivas, and J. J. Garcia-Luna-Aceves. A simple approximation to minimum-delay routing. vol. 29. No. 4. ACM, 1999.
W.-G. Tzeng and Z.-J. Tzeng, "A public-key traitor tracing scheme with revocation using dynamic shares," in Proc. PKC 2001, Cheju Island, Korea, Feb. 2001, pp. 207-224.
Waldvogel, Marcel "Fast Longest Prefix Matching: Algorithms, Analysis, and Applications", A dissertation submitted to the Swiss Federal Institute of Technology Zurich, 2002.
Walker, Iain S. Best practices guide for residential HVAC Retrofits. No. LBNL-53592. Ernest Orlando Lawrence Berkeley National Laboratory, Berkeley, CA (US), 2003.
Wang, Jiangzhe et al., "DMND: Collecting Data from Mobiles Using Named Data", Vehicular Networking Conference, 2010 IEEE, pp. 49-56.
Xylomenos, George, et al. "A survey of information-centric networking research." Communications Surveys & Tutorials, IEEE 16.2 (2014): 1024-1049.
Yi, Cheng, et al. 'A case for stateful forwarding plane.' Computer Communications 36.7 (2013): 779-791.
Yi, Cheng, et al. 'Adaptive forwarding in named data networking.' ACM SIGCOMM computer communication review 42.3 (2012): 62-67.
Zahariadis, Theodore, et al. "Trust management in wireless sensor networks." European Transactions on Telecommunications 21.4 (2010): 386-395.
Zhang, et al., "Named Data Networking (NON) Project", http://www.parc.com/publication/2709/named-data-networking-ndn-project.html, Oct. 2010, NDN-0001, PARC Tech Report.
Zhang, Lixia, et al. 'Named data networking.' ACM SIGCOMM Computer Communication Review 44.3 {2014): 66-73.
Soh et al., "Efficient Prefix Updates for IP Router Using Lexicographic Ordering and Updateable Address Set", Jan. 2008, IEEE Transactions on Computers, vol. 57, No. 1.
Beben et al., "Content Aware Network based on Virtual Infrastructure", 2012 13th ACIS International Conference on Software Engineering.
Biradar et al., "Review of multicast routing mechanisms in mobile ad hoc networks", Aug. 16, Journal of Network and Computer Applications 35 (2012) 221-229.
D. Trossen and G. Parisis, "Designing and realizing and information-centric internet," IEEE Communications Magazing, vol. 50, No. 7, pp. 60-67, Jul. 2012.
Garcia-Luna-Aceves et al., "Automatic Routing Using Multiple Prefix Labels", 2012, IEEE, Ad Hoc and Sensor Networking Symposium.
Gasti, Paolo et al., 'DoS & DDoS in Named Data Networking', 2013 22nd International Conference on Computer Communications and Networks (ICCCN), Aug. 2013,pp. 1-7.
Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.
J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.
J. Lotspiech, S. Nusser, and F. Pestoni. Anonymous Trust: Digit.
Kaya et al., "A Low Power Lookup Technique for Multi-Hashing Network Applications", 2006 IEEE Computer Society Annual Symposium on Emerging VLSI Technologies and Architectures, Mar. 2006.
S. Kamara and K Lauter. Cryptographic Cloud Storage. Financial Cryptography and Data Security. Springer Berlin Heidelberg (2010).
RTMP (2009). Available online at http://wwwimages.adobe.com/www.adobe.com/content/dam/Adobe/en/devnet/rtmp/ pdf/rtmp specification 1.0.pdf.
Hoque et al., "NLSR: Named-data Link State Routing Protocol", Aug. 12, 2013, ICN'13.
Nadeem Javaid, "Analysis and design of quality link metrics for routing protocols ri Wireless Networks", PhD Thesis Defense, Dec. 15, 2010, Universete Paris-Est.
Wetherall, David, "Active Network vision and reality: Lessons form a capsule-based system", ACM Symposium on Operating Systems Principles, Dec. 1, 1999. pp. 64-79.
Kulkarni A.B. et al., "Implementation of a prototype active network", IEEE, Open Architectures and Network Programming, Apr. 3, 1998, pp. 130-142.
Xie et al. "Collaborative Forwarding and Caching in Content Centric Networks", Networking 2012.
Amadeo et al. "Design and Analysis of a Transport-Level Solution for Content-Centric VANETs", University "Mediterranea" of Reggio Calabria, Jun. 15, 2013.
Lui et al. (A TLV-Structured Data Naming Scheme for Content-Oriented Networking, pp. 5822-5827, International Workshop on the Network of the Future, Communications (ICC), 2012 IEEE International Conference on Jun. 10-15, 2012).
Peter Dely et al. "Open Flow for Wireless Mesh Networks" Computer Communications and Networks, 2011 Proceedings of 20th International Conference on, IEEE, Jul. 31, 2011 (Jul. 31, 2011), pp. 1-6.
Garnepudi Parimala et al "Proactive, reactive and hybrid multicast routing protocols for Wireless Mesh Networks", 2013 IEEE International Conference on Computational Intelligence and Computing Research, IEEE, Dec. 26, 2013, pp. 1-7.
Tiancheng Zhuang et al. "Managing Ad Hoc Networks of Smartphones", International Journal of Information and Education Technology, Oct. 1, 2013.

* cited by examiner

CHANDRA-TOUEG CONSENSUS IN A CONTENT CENTRIC NETWORK

CROSS-REFERENCE TO RELATED APPLICATIONS

This application is a divisional of U.S. patent application Ser. No. 14/992,883, filed Jan. 11, 2016, the subject matter of this application is related to the subject matter in the following applications:

U.S. patent application Ser. No. 13/847,814, entitled "ORDERED-ELEMENT NAMING FOR NAME-BASED PACKET FORWARDING," by inventor Ignacio Solis, filed 20 Mar. 2013 (hereinafter "U.S. patent application Ser. No. 13/847,814");

U.S. patent application Ser. No. 12/338,175, entitled "CONTROLLING THE SPREAD OF INTERESTS AND CONTENT IN A CONTENT CENTRIC NETWORK," by inventors Van L. Jacobson and Diana K. Smetters, filed 18 Dec. 2008 (hereinafter "U.S. patent application Ser. No. 12/338,175");

U.S. patent application Ser. No. 14/476,264, entitled "SYSTEM AND METHOD FOR MAINTAINING A DISTRIBUTED AND FAULT-TOLERANT STATE OVER AN INFORMATION CENTRIC NETWORK," by inventor Glenn C. Scott, filed 3 Sep. 2014 (hereinafter "U.S. patent application Ser. No. 14/476,264");

the disclosures of which are herein incorporated by reference in their entirety.

BACKGROUND

This disclosure is generally related to distribution of digital content. More specifically, this disclosure is related to a system for facilitating synchronization via consensus by applying the Chandra-Toueg consensus algorithm in a content centric network.

RELATED ART

The proliferation of the Internet and e-commerce continues to create a vast amount of digital content. Content centric network (CCN) architectures have been designed to facilitate accessing and processing such digital content. A CCN includes entities, or nodes, such as network clients, forwarders (e.g., routers), and content producers, which communicate with each other by sending interest packets for various content items and receiving content-object packets in return. CCN interests and content objects are identified by their unique names, which are typically hierarchically structured variable length identifiers (HSVLI). An HSVLI can include contiguous name components ordered from a most general level to a most specific level.

A CCN is a distributed system where consensus among nodes is an important feature (e.g., agreeing on a single value that is the outcome of an election or an environmental observation). However, CCN nodes can crash and suffer a *Byzantine* failure. Consensus algorithms for a distributed system require that all processes involved in a system decision eventually terminate and that all processes decide on the same legitimate value that was proposed by some (e.g., a majority) processes. Though CCN brings many desirable features to a network, some issues remain unsolved for implementing a consensus algorithm.

SUMMARY

One embodiment provides a system that facilitates synchronization via consensus in a CCN. During operation, the system generates a first interest that indicates a vote for a value associated with a group prefix and a round number. In response to the first interest, the system receives a first content object that indicates an acknowledgment of the vote and has a payload that includes a nonce validator. In response to a second interest that indicates an acknowledgment of the first content object, the system receives a second content object that indicates a decision for the value and has a payload that includes a nonce which is used as a pre-image of the nonce validator. The system verifies the second content object based on the nonce and the nonce validator.

In some embodiments, in response to not receiving the first content object before an expiration of the first interest, and in response to determining that a current round number is the round number, the system re-transmits the first interest.

In some embodiments, in response to not receiving the first content object before an expiration of the first interest, and in response to determining that a current round number is a next round number, the system sets the current round number to the next round number, and transmits an interest that indicates a vote for a value associated with the group prefix and the current round number.

In some embodiments, in response to not receiving the second content object before an expiration of the second interest, the system generates a third interest that indicates a negative acknowledgment of the second interest.

In some embodiments, in response to the first interest, the system receives a marker content object that has a payload which includes a future name for a content object that will correspond to the first content object. The system generates a fourth interest with a name that is the future name. In response to the fourth interest, the system receives the first content object.

In some embodiments, in response to the second interest, the system receives a marker content object that has a payload which includes a future name for a content object that will correspond to the second content object. The system generates a fourth interest with a name that is the future name. In response to the fourth interest, the system receives the second content object.

In some embodiments, the acknowledgment of the vote indicated in the first content object further indicates that a majority of a plurality of nodes with the group prefix has submitted a vote for a value that is the same as the value indicated in the first interest, and the decision for the value indicated in the second content object further indicates that a majority of a plurality of nodes with the group prefix has submitted an acknowledgment of the first content object.

In some embodiments, verifying the second content object further comprises: performing a hash on the nonce; and determining that the hash matches the nonce validator.

Another embodiment provides a system that facilitates synchronization via consensus in a CCN. During operation, the system receives a first interest that indicates a vote for a value associated with a group prefix and a round number, wherein the computer system is a coordinator for a plurality of nodes associated with the group prefix. In response to receiving the first interest, and in response to receiving a vote for the value from a majority of the nodes, the system generates a first content object that indicates an acknowledgment of the vote and has a payload that includes a nonce validator. In response to receiving a second interest that indicates an acknowledgment of the first content object, and in response to receiving an acknowledgment of an acknowledgment of the vote for the value from the majority of the nodes, the system generates a second content object that indicates a decision for the value and has a payload that includes a nonce which is used as a pre-image of the nonce validator.

In some embodiments, generating the first content object further comprises: generating the nonce based on a random method; and performing a hash on the nonce to obtain the nonce validator.

In some embodiments, the system receives a third interest that indicates a negative acknowledgment of the second interest.

In some embodiments, in response to receiving the first interest, the system generates a marker content object that has a payload which includes a future name for a content object that will correspond to the first content object. In response to receiving a fourth interest with a name that is the future name, the system generates the first content object.

In some embodiments, in response to receiving the second interest, the system generates a marker content object that has a payload which includes a future name for a content object that will correspond to the second content object. In response to receiving a fourth interest with a name that is the future name, the system generates the second content object.

BRIEF DESCRIPTION OF THE FIGURES

In the figures, like reference numerals refer to the same figure elements.

DETAILED DESCRIPTION

Figure 1:
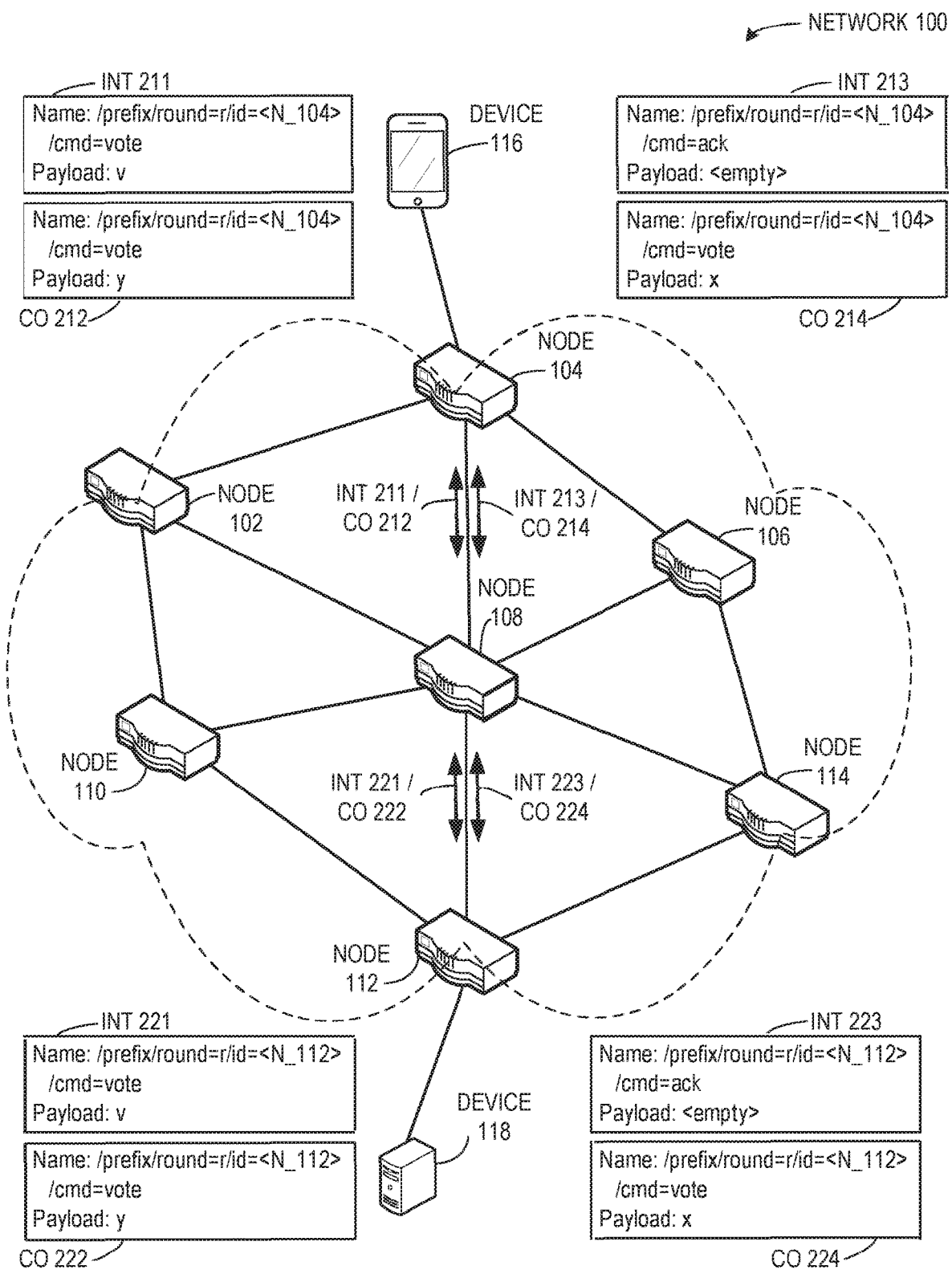
FIG. 1 illustrates an exemplary network facilitating synchronization via consensus in a content centric network, in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a system which provides synchronization via consensus by applying the Chandra-Toueg consensus algorithm in a content centric network. In a distributed system such as a CCN, nodes can crash and suffer *Byzantine* failures. Consensus in such a distributed system is used to reliably determine a single value that may be the outcome of, for example, an election or environmental observations. A consensus algorithm requires that the algorithm eventually terminates and that all nodes or processes "decide" on the same valid value proposed by some correct processes. For example, in a group of N processes or nodes, the Chandra-Toueg algorithm requires at least N/2 (e.g., a majority) non-faulty or correct processes to achieve the desired outcome. A coordinator process is chosen and known to all other processes in the group. The coordinator accepts "votes" for the desired value and if a majority of the nodes decide on the same value "V," the coordinator decides on and finalizes the value by informing all nodes of the decision for the value "V."

Each node can maintain a timer (e.g., a failure detector) after submitting messages corresponding to its vote and its acknowledgment of the selected value. If a failure of either message is detected, the node can re-submit its vote, submit a message of a negative acknowledgment, or choose a new coordinator at the next round. Eventually, a correct coordinator will be selected and, with a majority of correctly operating nodes, a sufficient number of votes (e.g., at least N/2) will be submitted for a decision to be made by the coordinator. The correctness of the Chandra-Toueg algorithm is guaranteed based on the timers and the progression of the rounds.

The Chandra-Toueg algorithm relies on the ability of nodes to directly address each other within a group (e.g., directly push messages). In contrast, communication between CCN nodes is performed on a pull-based model using interest and content object messages. Embodiments of the present invention map the flow of messages in the Chandra-Toueg algorithm to interest and content object messages in a CCN, and also rely on native communication timeouts for CCN nodes as failure detectors. In a CCN with a plurality of voting nodes and a known coordinator node, each voting node issues to the coordinator a vote for a value in the form of an interest. The coordinator waits until it has collected a majority of votes, responds with a "vote preference acknowledgment" content object, and includes in the payload a nonce validator, y, where y is the result of a hash function performed on a randomly generated nonce, x (i.e., such that y=H(x)). The nonce validator and the nonce are subsequently used by the voting nodes for verification. After receiving the vote preference acknowledgment content object, each node issues to the coordinator an acknowledgment interest and includes in the payload the nonce validator y, which confirms that the node acknowledges the preference for the value associated with y. The coordinator waits until it has collected a majority of acknowledgment interests, responds with a "decision content object," and includes in the payload the nonce x. Each node which submitted an acknowledgment interest then verifies the decision content object by checking that y=H(x), and if so, accepts the decision and terminates. This communication is described below in relation to FIGS. 1 and 2A.

Exceptions may occur during the communication between the voting nodes and the coordinator node. For example, the vote interest may time out, such that no vote preference acknowledgment content object is returned, or, the acknowledgment interest may time out, such that no decision content object is returned. These exceptions are described below in relation to FIGS. 2B and 2C. In some embodiments, an optimization feature allows the coordinator node to always respond immediately to both the vote interest and the acknowledgment interest by providing a content object with a payload that includes the name of a content object that will contain either the vote preference acknowledgment content object or the decision content object. This optimization feature is described below in relation to FIGS. 3C, 3D, and 4C. In addition, maintaining a distributed and fault-tolerant state for a variable over a CCN is described in U.S. patent application Ser. No. 14/476,264, which disclosure is herein incorporated by reference.

The following terms describe elements of a CCN architecture:

Content Object or "content object": A single piece of named data, which is bound to a unique name. Content Objects are "persistent," which means that a Content Object can move around within a computing device, or across different computing devices, but does not change. If any component of the Content Object changes, the entity that made the change creates a new Content Object that includes the updated content, and binds the new Content Object to a new unique name.

Unique Names: A name in a CCN is typically location independent and uniquely identifies a Content Object. A data-forwarding device can use the name or name prefix to forward a packet toward a network node that generates or stores the Content Object, regardless of a network address or physical location for the Content Object. In some embodiments, the name may be a hierarchically structured variable-length identifier (HSVLI). The HSVLI can be divided into several hierarchical components, which can be structured in various ways. For example, the individual name components pare, home, ccn, and test.txt can be structured in a left-oriented prefix-major fashion to form the name "/parc/home/ccn/test.txt." Thus, the name "/parc/home/ccn" can be a "parent" or "prefix" of "/parc/home/ccn/test.txt." Additional components can be used to distinguish between different versions of the content item, such as a collaborative document.

In some embodiments, the name can include a non-hierarchical identifier, such as a hash value that is derived from the Content Object's data (e.g., a checksum value) and/or from elements of the Content Object's name. A description of a hash-based name is described in U.S. patent application Ser. No. 13/847,814, which is hereby incorporated by reference. A name can also be a flat label. Hereinafter, "name" is used to refer to any name for a piece of data in a name-data network, such as a hierarchical name or name prefix, a flat name, a fixed-length name, an arbitrary-length name, or a label (e.g., a Multiprotocol Label Switching (MPLS) label).

Interest or "interest": A packet that indicates a request for a piece of data, and includes a name (or a name prefix) for the piece of data. A data consumer can disseminate a request or Interest across an information-centric network, which CCN routers can propagate toward a storage device (e.g., a cache server) or a data producer that can provide the requested data to satisfy the request or Interest.

The methods disclosed herein are not limited to CCN networks and are applicable to other architectures as well. A description of a CCN architecture is described in U.S. patent application Ser. No. 12/338,175, which is hereby incorporated by reference.

Exemplary Network and Overview of Exemplary Communication

FIG. 1 illustrates an exemplary network 100 facilitating synchronization via consensus in a content centric network, in accordance with an embodiment of the present invention. Network 100 can include a consumer or content-consuming device 116, a producer or content-producing device 118, and a router or other forwarding device at nodes 102, 104, 106, 108, 110, 112, and 114. A node can be a computer system, an end-point representing users, and/or a device that can generate interests or originate content. A node can also be an edge router (e.g., CCN nodes 102, 104, 112, and 114) or a core router (e.g., intermediate CCN routers 106-110). A group of nodes can participate in a consensus decision, and any node in the group may be chosen to act as the coordinator for a round related to the consensus decision.

Let "n" be the number of nodes in a group participating in a consensus decision, and let "r" be the current round number in which a consensus decision is to be attempted. Each node in a group has a predictable name and knows the group to which it belongs. Each group has a well-defined name prefix for routing purposes, e.g., "/group-name." All messages are directed to and from a coordinator which is determined by the current round number r, so the prefix for all messages will be "/group-name/r mod n."

During operation, nodes 102-114 can be seven nodes in a group participating in a consensus decision ("voting nodes"), and node 108 can be the coordinator node. Each voting node submits its vote to coordinator 108. For example, node 104 sends an interest 211 with the name "/prefix/round=r/id=<N_104>/cmd=vote" and a payload with a value of "v," where "/prefix" is the group prefix name and "<N_104>" is an identifier for node 104. Coordinator 108 waits until it has collected a majority of votes from the group (e.g., at least n/2, which is at least 4 votes when n is equal to 7), and subsequently sends to voting node 104 (and all other nodes that submitted a vote for the round, such as node 112 that submitted its vote via interest 112) a content object 212 with a payload that has a value of "y," where y is a nonce validator that is the result of a hash function performed on a randomly generated nonce value "x," such that y=H(x). The nonce and nonce validator are subsequently used for verification purposes. Content object 212 is a vote preference acknowledgment.

Upon receiving content object 212, node 104 (and all other nodes that receive the vote preference acknowledgment, such as node 112 that receives content object 222) submits an acknowledgment message to coordinator 108. For example, node 104 sends an interest 213 with the name "/prefix/round=r/id=<N_104>/cmd=ack" and an empty payload. Coordinator 108 again waits until it has collected a majority of acknowledgments from the group (e.g., at least n/2, or at least 4 votes), and subsequently sends to voting node 104 (and all other nodes that submitted an acknowledgment for the round, such as node 112 that submitted its acknowledgment via interest 223) a content object 214 with a payload that has a value of "x," where x is the randomly generated nonce that is used as the pre-image of the nonce validator y included in the payload of content object 212 (e.g., y=H(x)). Content object 214 indicates a decision for the value indicated in the votes for round r.

Upon receiving content object 214, node 104 (and all other nodes that receive the decision from coordinator 108, such as node 112 that receives content object 224) can verify the decision indicated in content object 212 by performing a hash on the nonce x (included in content object 214) and comparing it with the nonce validator y (included in content object 212). If the result matches, the voting node is assured that the decision is a valid decision for the value indicated in the vote for the current round r, and voting node 104 accepts the decision.

Thus, the system binds together the vote for the value (interest 211) and the vote preference acknowledgment (content object 212) with the acknowledgment of the vote preference acknowledgment (interest 213) and the final decision (content object 214) by using the nonce x and the nonce validator y. This allows each voting node to verify the correctness of the final decision from the coordinator (content object 214).

Detailed Description of Exemplary Communication

Figure 2A:
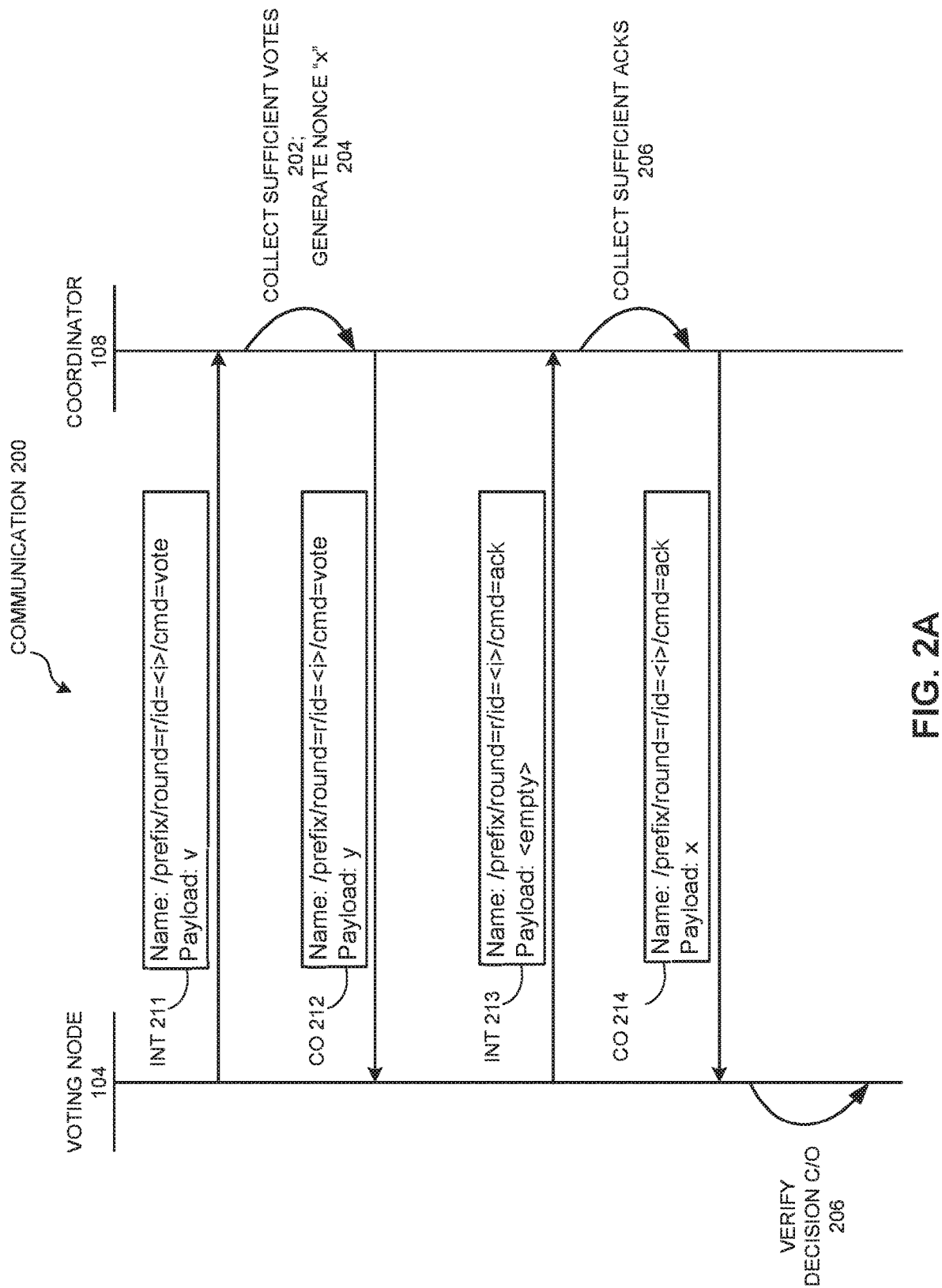
FIG. 2A presents exemplary communication between a voting node and a coordinator node, in accordance with an embodiment of the present invention.

FIG. 2A presents an exemplary communication 200 between a voting node 104 and a coordinator node 108, in accordance with an embodiment of the present invention. During operation, node 104 generates and transmits an interest 211 to coordinator 108. Interest 211 is a vote and has a name of "/prefix/round=r/id=<i>/cmd=vote" and a payload with a value of "v," where "prefix" is the group prefix, "r" is the current round number, and "<i>" is the identifier for node 104. Upon receiving interest 211, coordinator 108 collects a sufficient number of votes (function 202), e.g., from a majority of the voting nodes. Coordinator 118 also generates a random nonce "x" (function 204), and calculates a nonce validator "y" by performing a hash function on the nonce x. After collecting the sufficient number of votes, coordinator 108 generates and sends to node 104 a content object 212 with a name of "/prefix/round=r/id=<i>/cmd=vote" and a payload with a value of "y," where y is the nonce validator that is the result of the hash function performed on the randomly generated nonce value x ("vote preference acknowledgment"). Note that coordinator 108 also sends a similar vote preference acknowledgement to all voting nodes in the group.

Next, upon receiving content object 212, node 104 generates and transmits an interest 213 to coordinator 108. Interest 213 is an acknowledgment of the vote preference acknowledgment and has a name of "/prefix/round=r/id=<i>/cmd=ack" and an empty payload. Upon receiving interest 213, coordinator 108 collects a sufficient number of acknowledgments (function 206), e.g., from a majority of the voting nodes. After collecting the sufficient number of acknowledgments, coordinator 108 generates and sends to node 104 a content object 214 with a name of "/prefix/round=r/id=<i>/cmd=ack" and a payload with a value of "x," where x is the randomly generated nonce used as the pre-image of the nonce validator y (e.g., y=H(x)) ("decision content object"). Note that coordinator 118 also sends a similar decision content object to all voting nodes in the group.

Upon receiving content object 214, node 104 verifies the decision content object 214 by performing a hash on the nonce x (included in content object 214) and comparing it with the nonce validator y (included in content object 212) (function 206). If the result matches, node 104 accepts the decision and the process terminates.

Handling Exception During Consensus in a CCN

Communication 200 of FIG. 2A illustrates a case in which no failures occur. In most distributed systems, some message failures may occur. Embodiments of the present invention account for two possible types of message failure (from the perspective of the voting node): 1) the initial vote interest times out (i.e., a vote preference acknowledgment content object is never returned); and 2) the acknowledgment interest times out (i.e., a decision content object is never returned). The first case (initial vote interest times out) is described below in relation to FIG. 2B, and the second case (acknowledgment interest times out) is described below in relation to FIG. 2C.

Figure 2B:
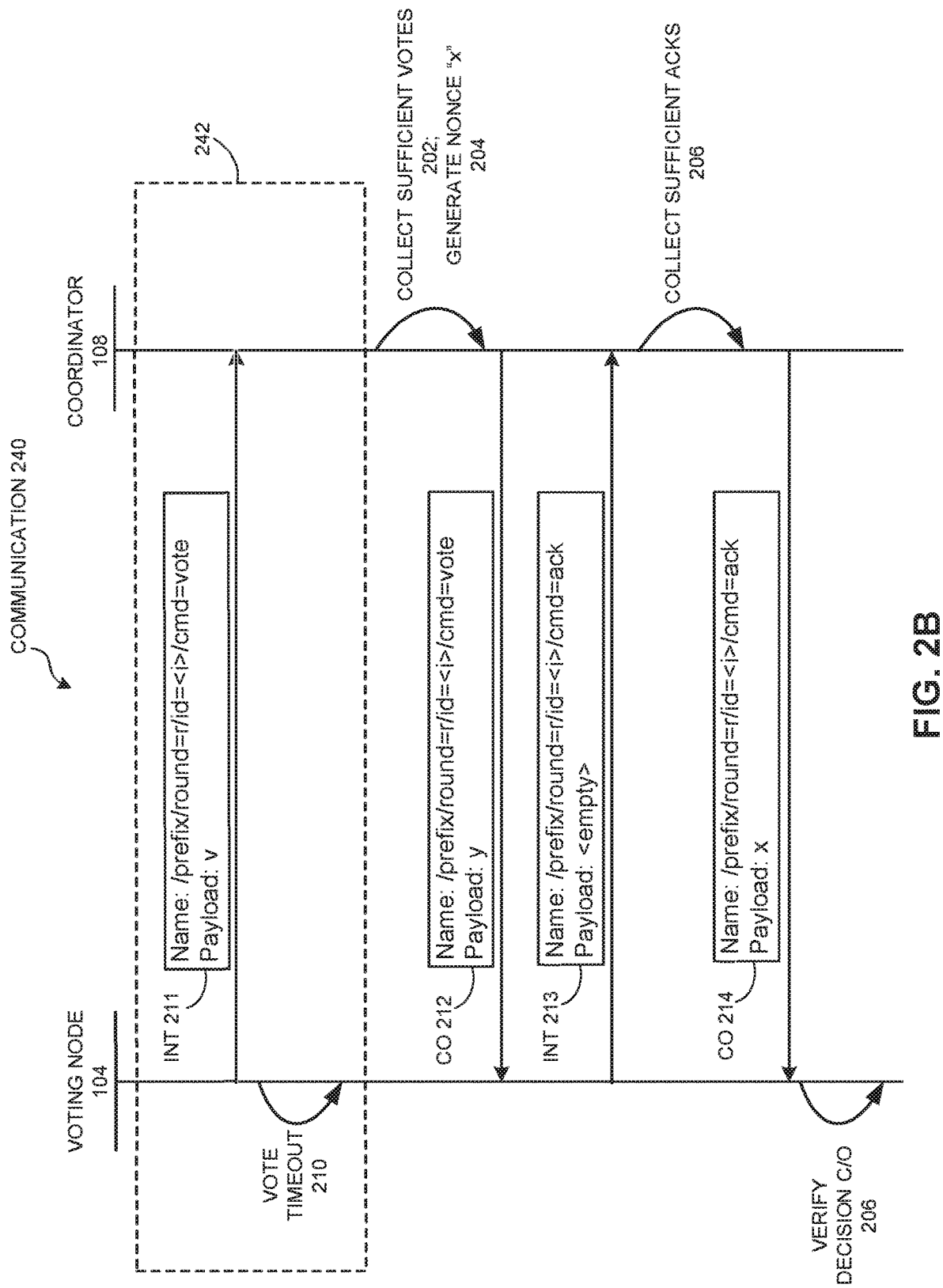
FIG. 2B presents exemplary communication between a voting node and a coordinator node, including handling of an exception, in accordance with an embodiment of the present invention.

FIG. 2B presents an exemplary communication 240 between a voting node 104 and a coordinator node 108, including handling of an exception, in accordance with an embodiment of the present invention. During operation, node 104 generates and transmits interest 211 to coordinator 108. Interest 211 is a vote and has a name of "/prefix/round=r/id=<i>/cmd=vote" and a payload with a value of "v." If node 104 does not receive a responsive content object, node 104 will re-submit interest 211 (depicted within dashed box 242) until it receives a responsive vote preference acknowledgment content object (e.g., content object 212), or until the round number evolves (i.e., the group moves to round r+1) and the vote times out (function 210). Node 104 can re-submit its vote based on a time expiration of a corresponding entry in its pending interest table or any other parameter determined by the system. If the vote does not time out, the communication proceeds as described above in relation to FIG. 2A. If the vote does time out, then node 104 can send another vote for the next round by restarting the communication (not shown).

Figure 2C:
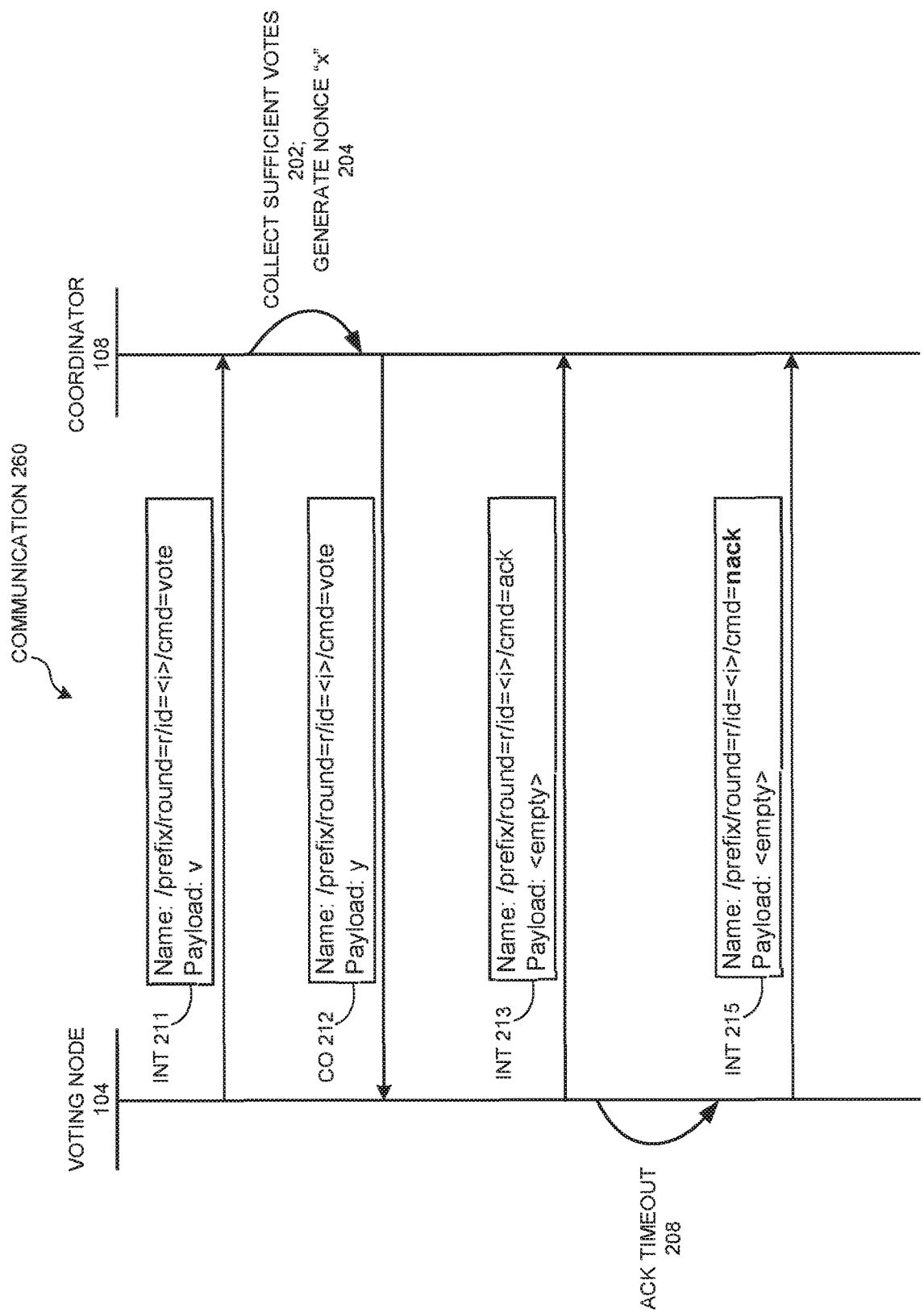
FIG. 2C presents exemplary communication between a voting node and a coordinator node, including handling of an exception, in accordance with an embodiment of the present invention.

FIG. 2C presents an exemplary communication 260 between a voting node 104 and a coordinator node 108, including handling of an exception, in accordance with an embodiment of the present invention. During operation, voting node 104 and coordinator node 108 communicate as described above in relation to FIG. 2A. However, upon sending interest 213 (the acknowledgment of the vote preference acknowledgment), if node 104 does not receive a responsive content object before the expiration of interest 213 (acknowledgment timeout function 208), node 104 will submit a negative acknowledgment in the form of interest 215, which has a name of "/prefix/round=r/id=<i>/cmd=nack" and an empty payload. This negative acknowledgment interest 215 indicates that node 104 did not accept the preference because it assumes a faulty coordinator node. Node 104 then waits until the next round r+1 to submit a vote.

Role of Voting in Facilitating Synchronization Via Consensus

Figure 3A:
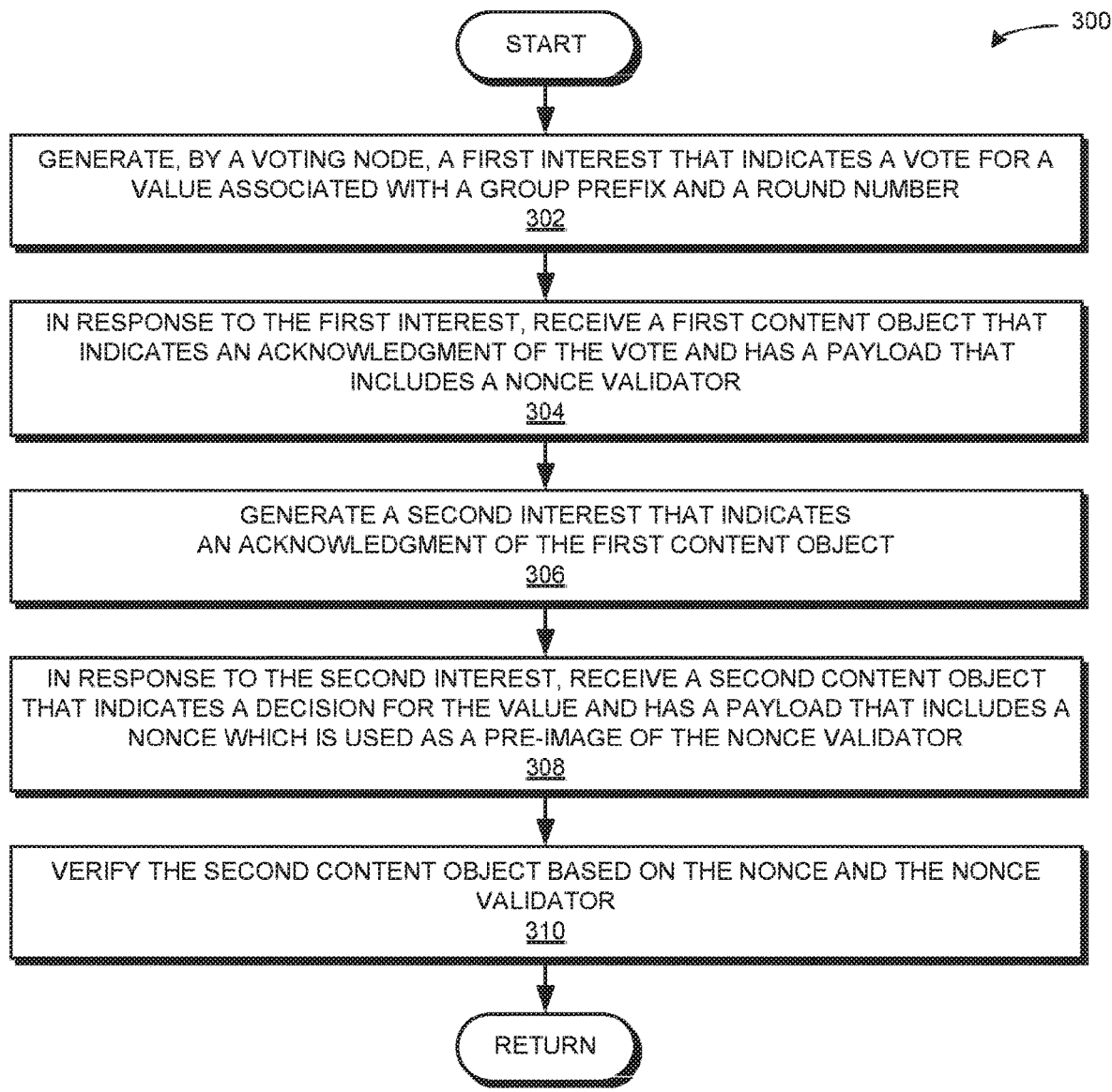
FIG. 3A presents a flow chart illustrating a method by a voting node for facilitating synchronization via consensus in a content centric network, in accordance with an embodiment of the present invention.

FIG. 3A presents a flow chart 300 illustrating a method by a voting node for facilitating synchronization via consensus in a content centric network, in accordance with an embodiment of the present invention. During operation, the system generates, by a voting node, a first interest that indicates a vote for a value associated with a group prefix and a round number (operation 302). A name for the interest can be a hierarchically structured variable length identifier comprising contiguous name components ordered from a most general level to a most specific level. In response to the first interest, the system receives a first content object that indicates an acknowledgment of the vote and has a payload that includes a nonce validator ("vote preference acknowledgment") (operation 304). The system generates a second interest that indicates an acknowledgment of the first content object ("acknowledgment of the vote preference acknowledgment") (operation 306). In response to the second interest, the system receives a second content object that indicates a decision for the value and has a payload that includes a nonce which is used as a pre-image of the nonce validator ("decision content object") (operation 308). Subsequently, the system verifies the second content object based on the nonce and the nonce validator (operation 310). The system can verify the decision content object by performing a hash on the nonce and comparing the result of the hash with the nonce validator.

Figure 3B:
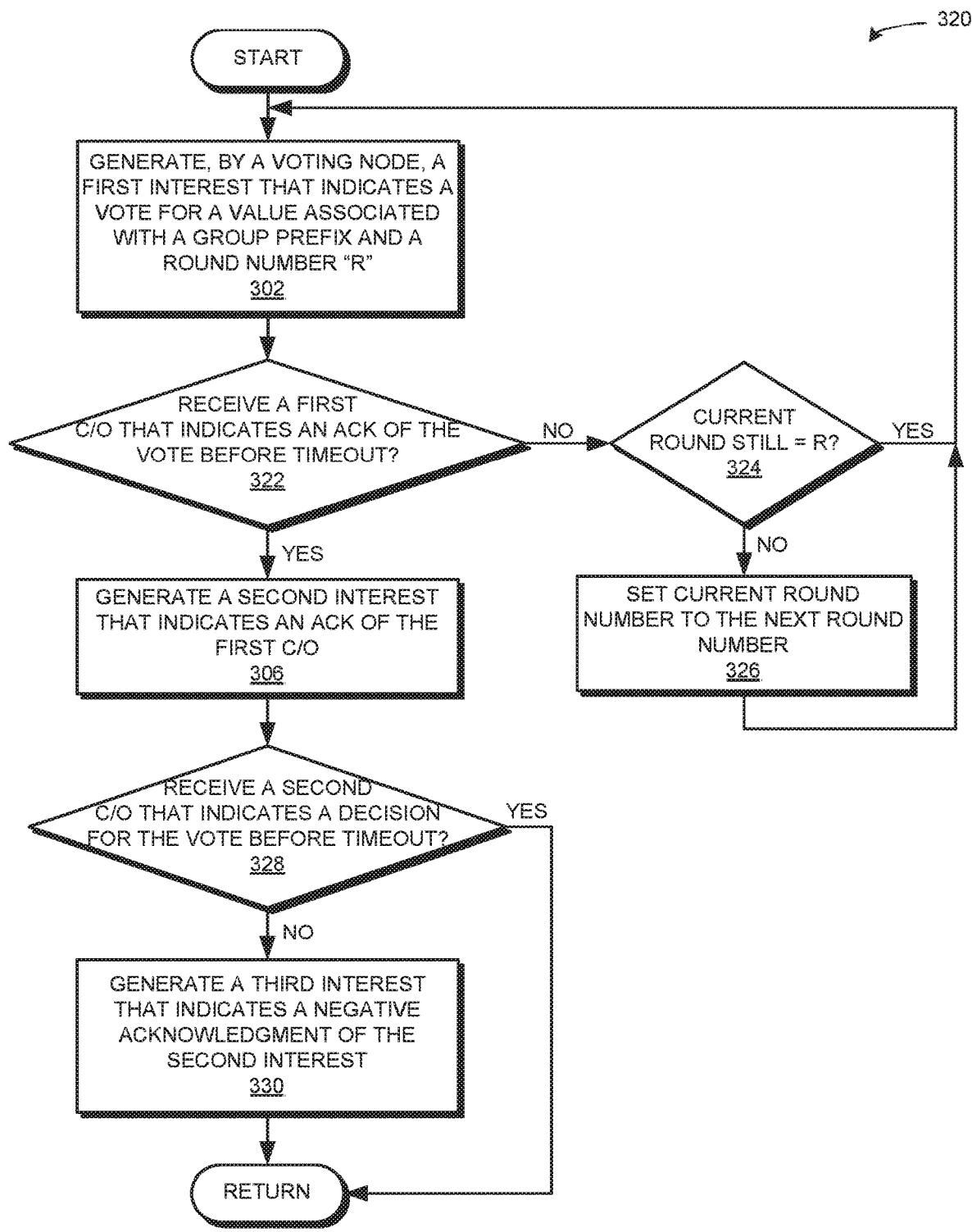
FIG. 3B presents a flow chart illustrating a method by a voting node for facilitating synchronization via consensus in a content centric network, including exception handling, in accordance with an embodiment of the present invention.

FIG. 3B presents a flow chart 320 illustrating a method by a voting node for facilitating synchronization via consensus in a content centric network, including exception handling, in accordance with an embodiment of the present invention. During operation, the system generates, by a voting node, a first interest that indicates a vote for a value associated with a group prefix and a round number "r" (operation 302). The system determines whether it receives a first content object that indicates an acknowledgment of the vote and has a payload that includes a nonce validator ("vote preference acknowledgment") before a timeout for the first interest (decision 322). If the system does not receive a vote preference acknowledgment before the timeout for the first interest, the system determines whether the current round is still r (decision 324). If the current round is still r, the system returns to operation 302 and proceeds to generate another interest vote. If the current round is not r, the system sets the current round number to the next round number (e.g., r+1) (operation 326), returns to operation 302, and proceeds to generate another interest vote for the next round.

If the system does receive a vote preference acknowledgment before the timeout for the first interest (decision 322), the system generates a second interest that indicates an acknowledgment of the first content object ("acknowledgment of the vote preference acknowledgment") (operation 306). The system determines whether it receives a second content object before the timeout for the second interest, where the second content object indicates a decision for the vote (e.g., the value) and has a payload that includes the nonce used as a pre-image of the nonce validator ("decision content object") (decision 328). If the system does not receive the decision content object before the timeout for the second interest, the system generates a third interest that indicates a negative acknowledgment of the second interest (operation 330) and the operation returns. If the system does receive the decision content object before the timeout for the second interest, the operation returns.

Figure 3C:
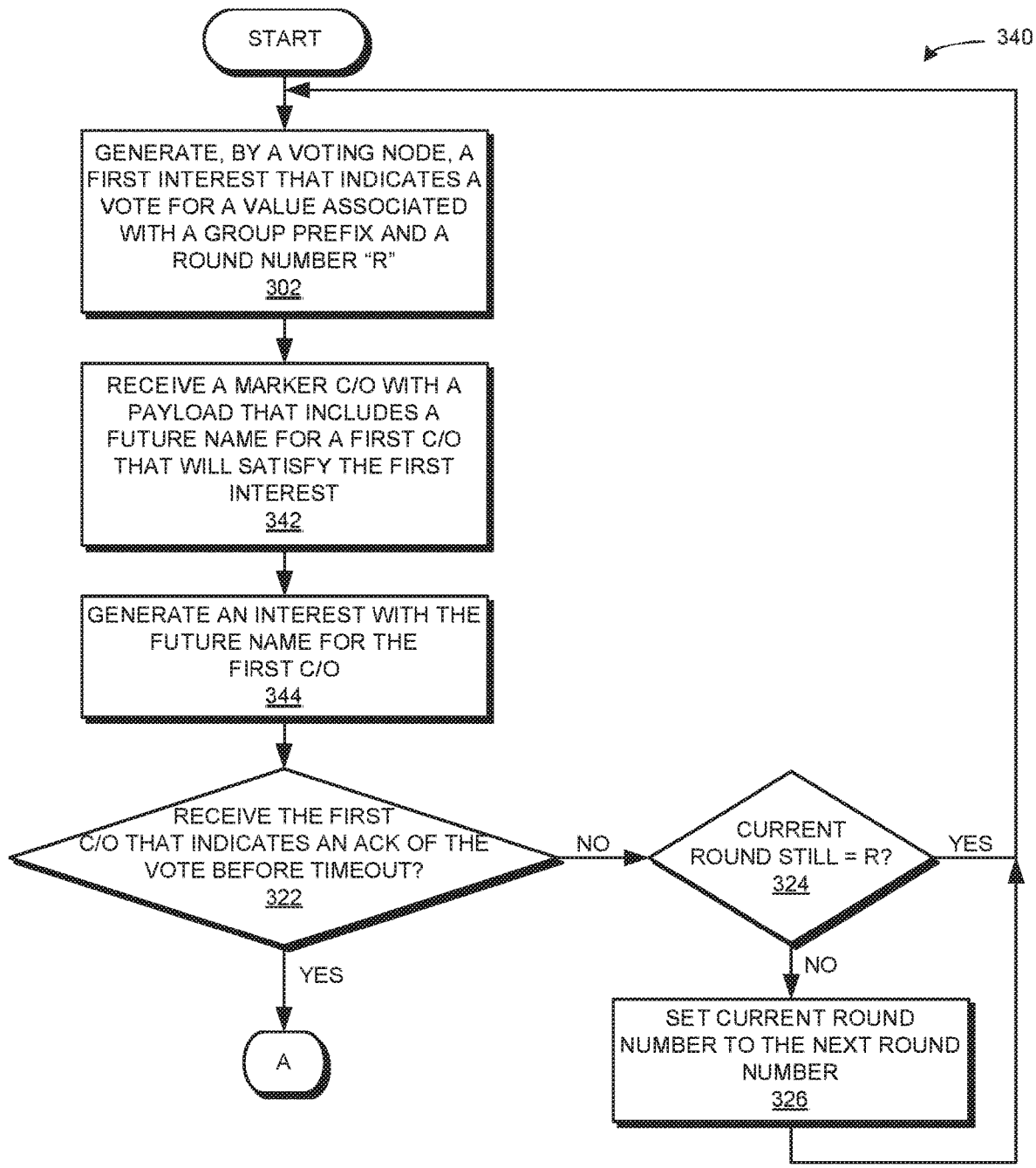
FIG. 3C presents a flow chart illustrating a method by a voting node for facilitating synchronization via consensus in a content centric network, including exception handling and an optimization feature, in accordance with an embodiment of the present invention.

FIG. 3C presents a flow chart 340 illustrating a method by a voting node for facilitating synchronization via consensus in a content centric network, including exception handling and an optimization feature, in accordance with an embodiment of the present invention. The optimization feature allows the coordinator node to always respond immediately to both the vote interest and the acknowledgment interest by providing a content object that indicates the name of a content object that will eventually contain the responsive content object. During operation, the system generates, by a voting node, a first interest that indicates a vote for a value associated with a group prefix and a round number "r" (operation 302). The system receives a marker content object with a payload that includes a future name for a first content object that will satisfy the first interest (operation 342). In some embodiments, the marker content object is similar to a Future object in Java. The system generates an interest with the future name for the first content object (operation 344). Subsequent decision 322 and operations 324 and 326 occur as described in relation to FIG. 3A. If the system does receive a vote preference acknowledgment before the timeout for the first interest (decision 322), the operation continues as described at Label A of FIG. 3D.

Figure 3D:
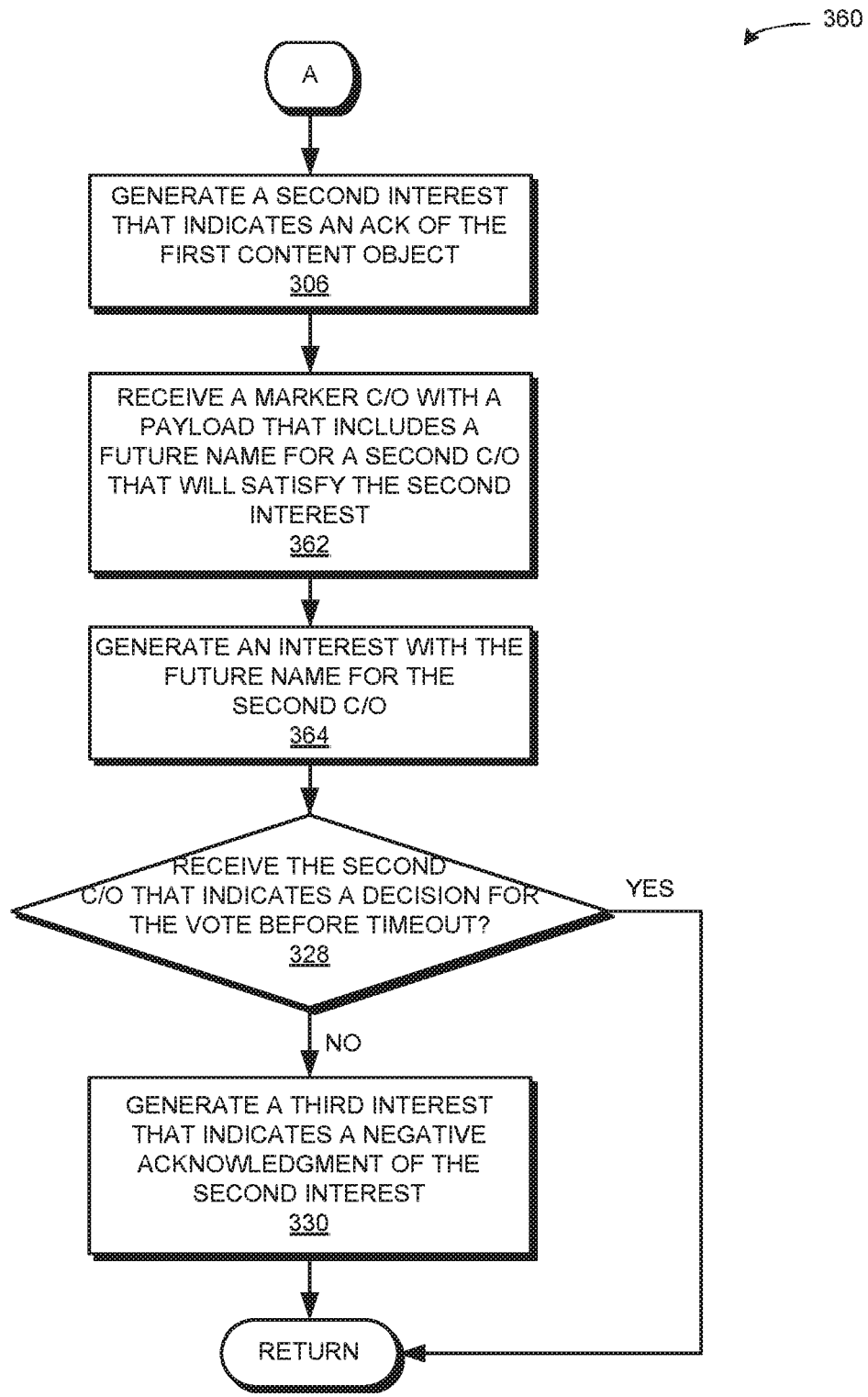
FIG. 3D presents a flow chart illustrating a method by a voting node for facilitating synchronization via consensus in a content centric network, including exception handling and an optimization feature, in accordance with an embodiment of the present invention.

FIG. 3D presents a flow chart 360 illustrating a method by a voting node for facilitating synchronization via consensus in a content centric network, including exception handling and an optimization feature, in accordance with an embodiment of the present invention. The system generates, by the voting node, a second interest that indicates an acknowledgment of the first content object ("acknowledgment of the vote preference acknowledgment") (operation 306). The system receives a marker content object with a payload that includes a future name for a second content object that will satisfy the second interest (operation 362). The system generates an interest with the future name for the second content object (operation 364). Subsequent decision 328 and operation 330 occur as described in relation to FIG. 3A.

Role of Coordinator Node in Facilitating Synchronization via Consensus

Figure 4A:
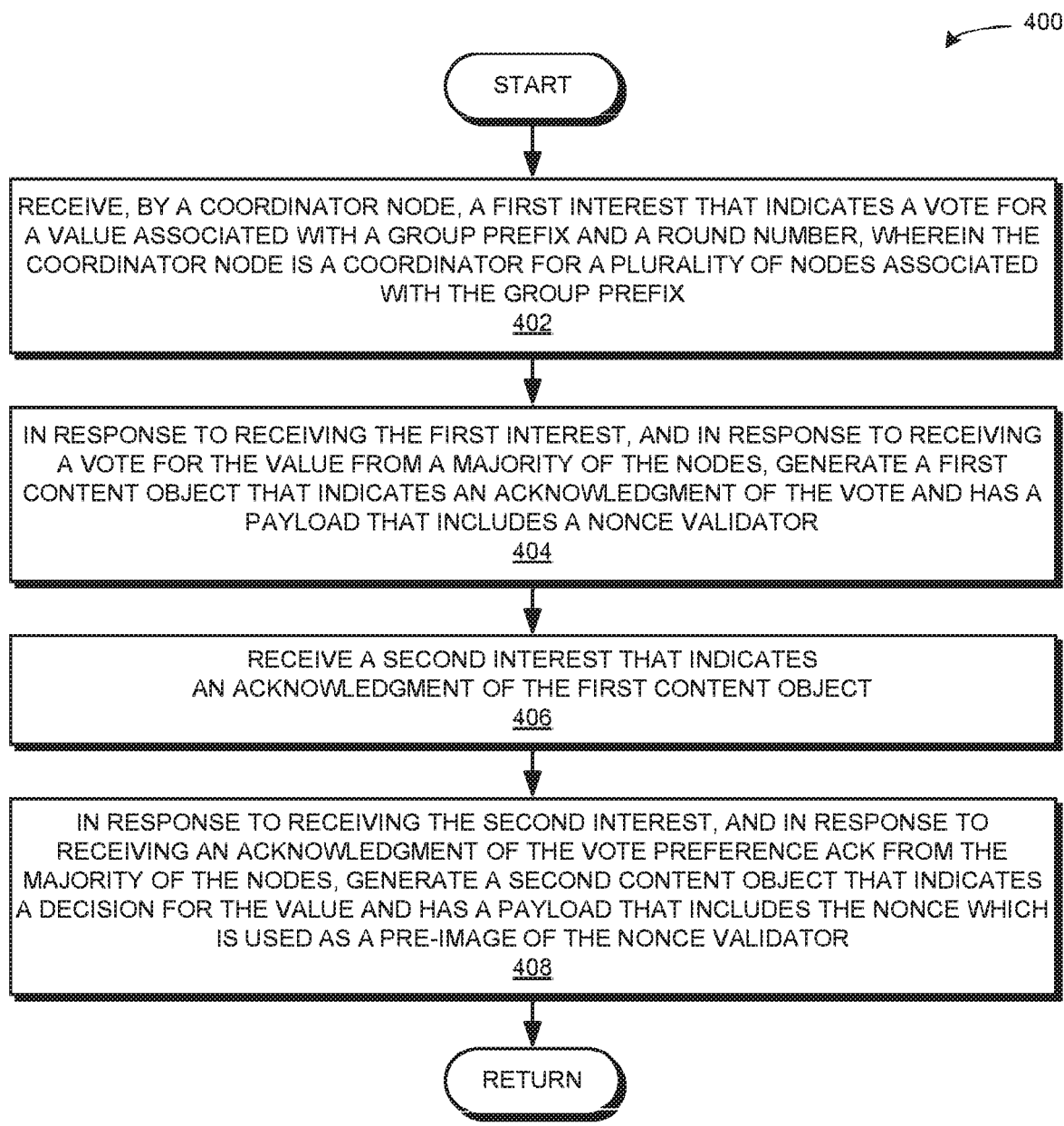
FIG. 4A presents a flow chart illustrating a method by a coordinator node for facilitating synchronization via consensus in a content centric network, in accordance with an embodiment of the present invention.

FIG. 4A presents a flow chart 400 illustrating a method by a coordinator node for facilitating synchronization via consensus in a content centric network, in accordance with an embodiment of the present invention. During operation, the system receives, by a coordinator node, a first interest that indicates a vote for a value associated with a group prefix and a round number, wherein the coordinator node is a coordinator for a plurality of nodes associated with the group prefix (operation 402). A name for the interest can be hierarchically structured variable length identifier comprising contiguous name components ordered from a most general level to a most specific level. In response to receiving the first interest (i.e., "vote"), and in response to receiving a vote for the value from a majority of the nodes, the system generates a first content object that indicates an acknowledgment of the vote and has a payload that includes a nonce validator ("vote preference acknowledgment") (operation 404). The system determines the nonce validator by generating a random nonce, performing a hash on the nonce to obtain the nonce validator, and including the nonce validator in the payload of the first content object. Subsequently, the system receives a second interest that indicates an acknowledgment of the first content object ("acknowledgment of the vote preference acknowledgment") (operation 406). In response to receiving the second interest, and in response to receiving an acknowledgment of the vote preference acknowledgment from the majority of the nodes, the system generates a second content object that indicates a decision for the value and has a payload that includes the nonce which is used as a pre-image of the nonce validator ("decision content object") (operation 408).

Figure 4B:
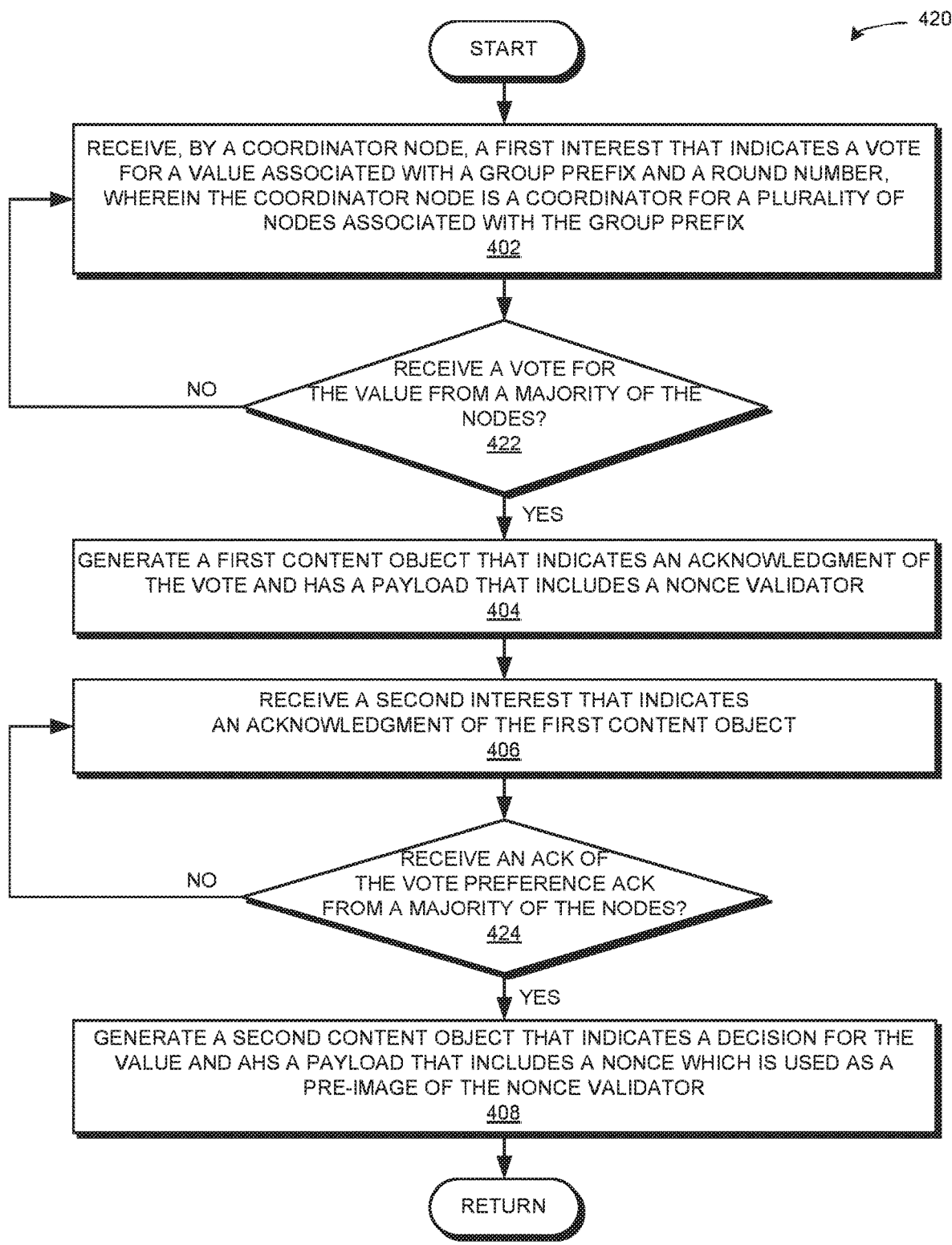
FIG. 4B presents a flow chart illustrating a method by a coordinator node for facilitating synchronization via consensus in a content centric network, including exception handling, in accordance with an embodiment of the present invention.

FIG. 4B presents a flow chart 420 illustrating a method by a coordinator node for facilitating synchronization via consensus in a content centric network, including exception handling, in accordance with an embodiment of the present invention. FIG. 4B includes similar operations as FIG. 4A, with the addition of two decision operations (422 and 424) that cover the two possible types of message failure described above (i.e., initial vote interest time out and acknowledgment interest time out). During operation, the system receives, by a coordinator node, a first interest that indicates a vote for a value associated with a group prefix and a round number, wherein the coordinator node is a coordinator for a plurality of nodes associated with the group prefix (operation 402). The system determines whether it receives a vote for the value from a majority of the nodes (decision 422) (e.g., if it has collected sufficient votes). If it does not, the system waits to collect sufficient votes and returns to operation 402. If it does, the system generates a first content object that indicates an acknowledgment of the vote and has a payload that includes a nonce validator ("vote preference acknowledgment") (operation 404). Subsequently, the system receives a second interest that indicates an acknowledgment of the first content object ("acknowledgment of the vote preference acknowledgment") (operation 406). The system determines whether it receives an acknowledgment of the vote preference acknowledgment from the majority of the nodes (decision 424). If it does not, the system waits to collect sufficient acknowledgments and returns to operation 406. If it does, the system generates a second content object that indicates a decision for the value and has a payload that includes the nonce which is used as a pre-image of the nonce validator ("decision content object") (operation 408).

Figure 4C:
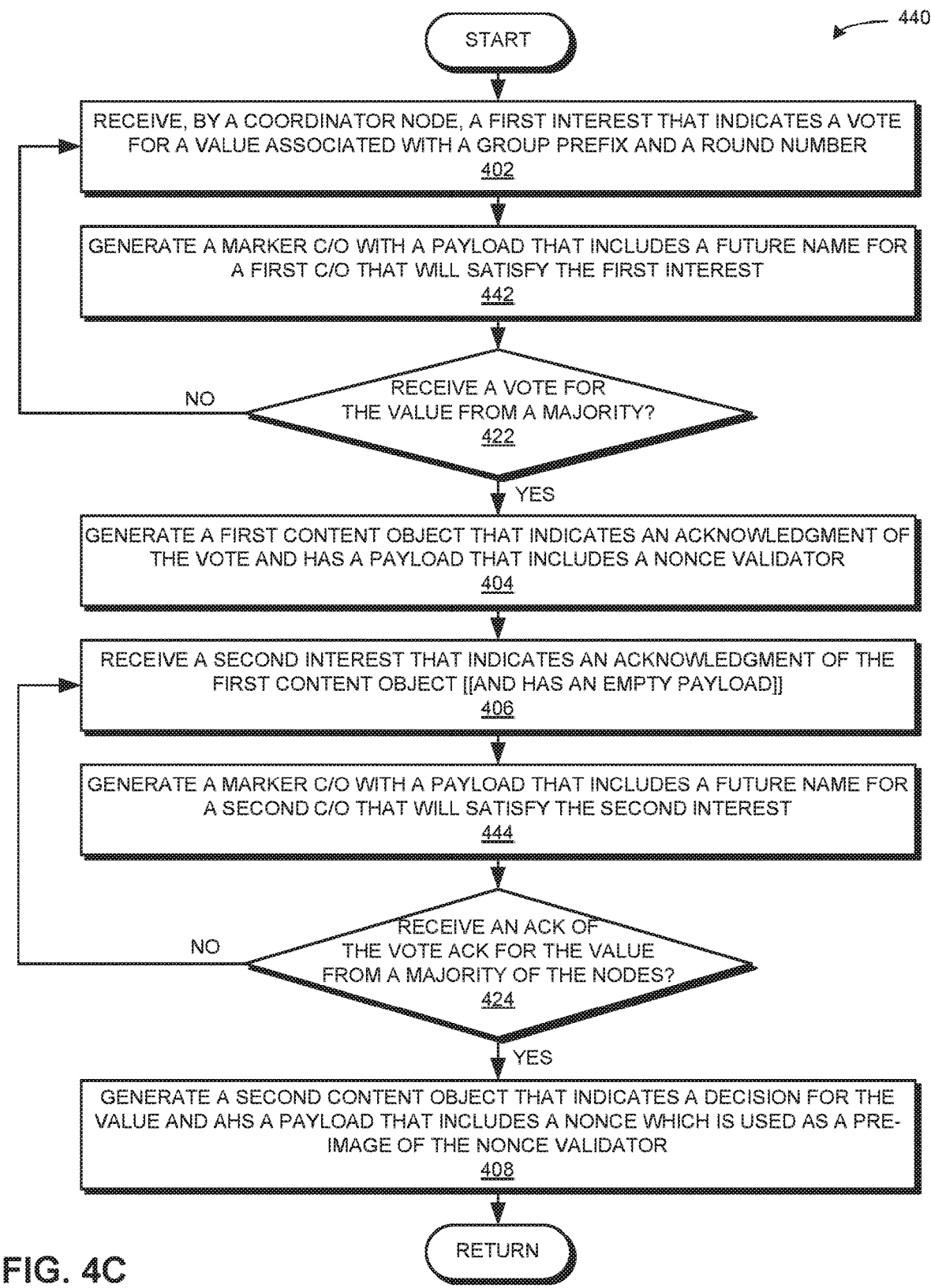
FIG. 4C presents a flow chart illustrating a method by a coordinator node for facilitating synchronization via consensus in a content centric network, including exception handling and an optimization feature, in accordance with an embodiment of the present invention.

FIG. 4C presents a flow chart 440 illustrating a method by a coordinator node for facilitating synchronization via consensus in a content centric network, including exception handling and an optimization feature, in accordance with an embodiment of the present invention. FIG. 4C includes similar operations as FIG. 4B, with the addition of two operations (442 and 444) that cover the optimization feature of allowing the coordinator node to always respond immediately to received interests (i.e., a vote interest and an acknowledgment of the vote preference acknowledgment). During operation, the system receives, by a coordinator node, a first interest that indicates a vote for a value associated with a group prefix and a round number, wherein the coordinator node is a coordinator for a plurality of nodes associated with the group prefix (operation 402). The system generates a marker content object with a payload that includes a future name for a first content object that will satisfy the first interest (operation 442). The system determines whether it receives a vote for the value from a majority of the nodes (decision 422) (e.g., if it has collected sufficient votes). If it does not, the system waits to collect sufficient votes and returns to operation 402. If it does, the system generates a first content object that indicates an acknowledgment of the vote and has a payload that includes a nonce validator ("vote preference acknowledgment") (operation 404). Subsequently, the system receives a second interest that indicates an acknowledgment of the first content object ("acknowledgment of the vote preference acknowledgment") (operation 406). The system generates a marker content object with a payload that includes a future name a second content object that will satisfy the second interest (operation 444). The system determines whether it receives an acknowledgment of the vote preference acknowledgment from the majority of the nodes (decision 424). If it does not, the system waits to collect sufficient acknowledgments and returns to operation 406. If it does, the system generates a second content object that indicates a decision for the value and has a payload that includes the nonce which is used as a pre-image of the nonce validator ("decision content object") (operation 408).

Exemplary Computer System

Figure 5:
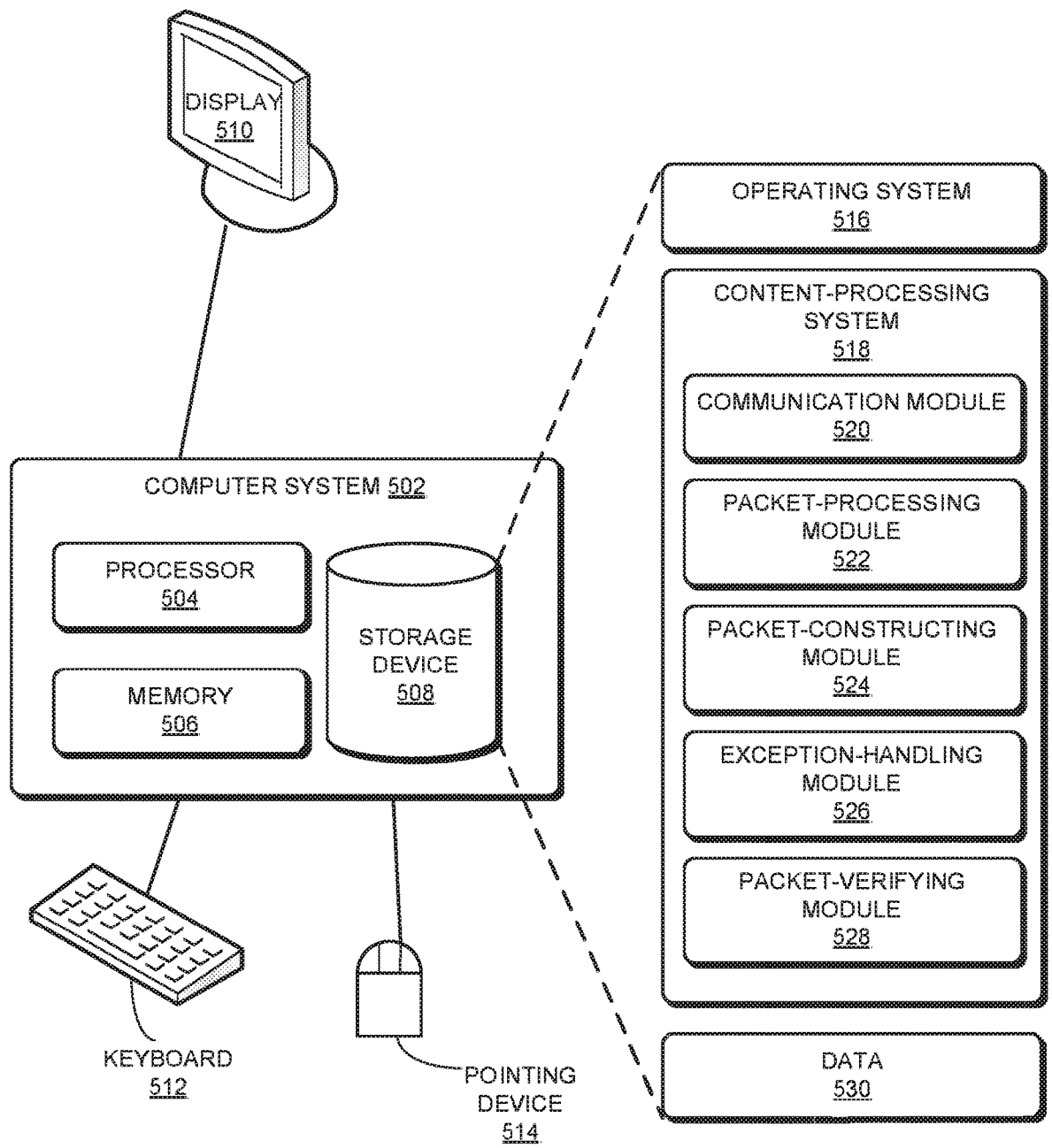
FIG. 5 illustrates an exemplary computer system that facilitates synchronization via consensus in a content centric network, in accordance with an embodiment of the present invention.

FIG. 5 illustrates an exemplary computer system 502 that facilitates synchronization via consensus in a content centric network, in accordance with an embodiment of the present invention. Computer system 502 includes a processor 504, a memory 506, and a storage device 508. Memory 506 can include a volatile memory (e.g., RAM) that serves as a managed memory, and can be used to store one or more memory pools. Furthermore, computer system 502 can be coupled to a display device 510, a keyboard 512, and a pointing device 514. Storage device 508 can store an operating system 516, a content-processing system 518, and data 530.

Content-processing system 518 can include instructions, which when executed by computer system 502, can cause computer system 502 to perform methods and/or processes described in this disclosure. Specifically, content-processing system 518 may include instructions for sending and/or receiving data packets to/from other network nodes across a computer network, such as a content centric network, where a data packet can correspond to an interest or a content-object packet with a name and a payload (communication module 520). Content-processing system 518 may include instructions for generating a first interest that indicates a vote for a value associated with a group prefix and a round number (packet-constructing module 524). Content-processing system 518 may include instructions for, in response to the first interest, receiving a first content object that indicates an acknowledgment of the vote and has a payload that includes a nonce validator (communication module 520). Content-processing system 518 may include instructions for, in response to a second interest that indicates an acknowledgment of the first content object, receiving a second content object that indicates a decision for the value and has a payload that includes a nonce which is used as a pre-image of the nonce validator (communication module 520). Content-processing system 518 may include instructions for verifying the second content object based on the nonce and the nonce validator (packet-verifying module 528).

Content-processing system 518 can include instructions for, in response to not receiving the first content object before an expiration of the first interest, and in response to determining that a current round number is the round number (exception-handling module 526), re-transmitting the first interest (communication module 520). Content-processing system 518 can include instructions for, in response to not receiving the first content object before an expiration of the first interest, and in response to determining that a current round number is a next round number (exception-handling module 526), setting the current round number to the next round number (exception-handling module 526), and transmitting an interest that indicates a vote for a value associated with the group prefix and the current round number (communication module 520). Content-processing system 518 can include instructions for, in response to not receiving the second content object before an expiration of the second interest (exception-handling module 526), generating a third interest that indicates a negative acknowledgment of the second interest (packet-constructing module 524).

Content-processing system 518 can include instructions for, in response to the first interest, receiving a marker content object that has a payload which includes a future name for a content object that will correspond to the first content object (communication module 520). Content-processing system 518 can include instructions for generating a fourth interest with a name that is the future name (packet-constructing module 524), and, in response to the fourth interest, receiving the first content object (communication module 520). Content-processing system 518 can include instructions for, in response to the second interest, receiving a marker content object that has a payload which includes a future name for a content object that will correspond to the second content object (communication module 520). Content-processing system 518 can include instructions for generating a fourth interest with a name that is the future name (packet-constructing module 524), and, in response to the fourth interest, receiving the second content object (communication module 520). Content-processing system 518 can include instructions for performing a hash on the nonce and determining that the hash matches the nonce validator (packet-verifying module 528)

Content-processing system 518 can further include instructions for receiving a first interest that indicates a vote for a value associated with a group prefix and a round number (communication module 520). Content-processing system 518 can include instructions for, in response to receiving the first interest (communication module 520), and in response to receiving a vote for the value from a majority of the nodes (packet-processing module 522), generating a first content object that indicates an acknowledgment of the vote and has a payload that includes a nonce validator (packet-constructing module 524). Content-processing system 518 can include instructions for, in response to receiving a second interest that indicates an acknowledgment of the first content object (communication module 520), and in response to receiving an acknowledgment of an acknowledgment of the vote for the value from the majority of the nodes (packet-processing module 522), generating a second content object that indicates a decision for the value and has a payload that includes a nonce which is used as a pre-image of the nonce validator (packet-constructing module 524). Content-processing system 518 can include instructions for generating the nonce based on a random method and performing a hash on the nonce to obtain the nonce validator (packet-verifying module 528). Content-processing system 518 can include instructions for receiving a third interest that indicates a negative acknowledgment of the second interest (communication module 520).

Content-processing system 518 can include instructions for, in response to receiving the first interest (communication module 520), generating a marker content object that has a payload which includes a future name for a content object that will correspond to the first content object (packet-constructing module 524). Content-processing system 518 can include instructions for, in response to receiving a fourth interest with a name that is the future name, the system generating the first content object (packet-constructing module 524).

Content-processing system 518 can include instructions for, in response to receiving the second interest (communication module 520), generating a marker content object that has a payload which includes a future name for a content object that will correspond to the second content object (packet-constructing module 524). Content-processing system 518 can include instructions for, in response to receiving a fourth interest with a name that is the future name (communication module 520), generating the second content object (packet-constructing module 524).

Data 530 can include any data that is required as input or that is generated as output by the methods and/or processes described in this disclosure. Specifically, data 530 can store at least: an interest packet; a content-object packet; a vote; a value for a decision; a vote for a value; a group prefix; a round number; a nonce; a nonce validator that is the result of a hash function performed on the nonce; a first interest that indicates a vote for a value associated with a group prefix and a round number; a first content object that indicates an acknowledgment of the vote and has a payload that includes a nonce validator; a second interest that indicates an acknowledgment of the first content object; a second content object that indicates a decision for the value and has a payload that includes a nonce which is used as a pre-image of the nonce validator; a timeout or expiration time for the first or second interest; a third interest that indicates a negative acknowledgment of the second interest; a marker content object that has a payload which includes a future name for a content object that will correspond to the first content object or the second content object; a future name; a fourth interest with a name that is the future name; and an indicator of a majority of a plurality of nodes that share a same group prefix.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer system that operates as a coordinator for facilitating synchronization via consensus between a plurality of nodes in a content centric network using interests and content objects to communicate between the plurality of nodes, the plurality of nodes associated with a group prefix for routing in the content centric network, the system comprising:
- a processor; and
- a storage device storing instructions that when executed by the processor cause the processor to perform a method, the method comprising:
  - receiving a first interest that includes a name and a payload, wherein a name in the content centric network is a hierarchically structured variable length identifier comprising contiguous name components ordered from a most general level to a most specific level, wherein the name of the first interest indicates a vote and a round number, and wherein the payload of the first interest includes a value associated with the group prefix;
  - in response to receiving the first interest, and in response to receiving a vote for the value from a majority of the plurality of nodes, generating a first content object that includes a name and a payload, wherein the name of the first content object indicates an acknowledgment of the vote, wherein the acknowledgement indicates that a majority of the plurality of nodes have submitted a vote for a value that is the same as the value indicated in the first interest, and wherein the payload of the first content object includes a nonce validator;
  - in response to receiving a second interest that indicates an acknowledgment of the first content object, and in response to receiving an acknowledgment of an acknowledgment of the vote for the value from the majority of the plurality of nodes, generating a second content object that includes a payload and a name that indicates a decision for the value, wherein the decision indicates that a majority of the plurality of nodes have submitted an acknowledgment of the first content object, and wherein the payload of the second content object includes a nonce which is used as a pre-image of the nonce validator; and
  - determining that the decision for the value indicated by the vote is a valid decision determined by consensus of the plurality of nodes, thereby achieving synchronization via consensus among the plurality of nodes in the content centric network.

2. The computer system of claim 1, wherein generating the first content object further comprises:
- generating a nonce based on a random method; and
- performing a hash on the nonce to obtain the nonce validator.

3. The computer system of claim 1, wherein the method further comprises:
- receiving a third interest that indicates a negative acknowledgment of the second interest.

4. The computer system of claim 1, wherein the method further comprises:
- in response to receiving the first interest, generating a marker content object that has a payload which includes a future name for a content object that will correspond to the first content object; and
- in response to receiving a fourth interest with a name that is the future name, generating the first content object.

5. The computer system of claim 1, wherein the method further comprises:
- in response to receiving the second interest, generating a marker content object that has a payload which includes a future name for a content object that will correspond to the second content object; and
- in response to receiving a fourth interest with a name that is the future name, generating the second content object.

6. The computer system of claim 1, wherein the method further comprises:
- in response to receiving the first interest, determining whether a vote has been received from the majority of the plurality of nodes;
- upon determining that a vote has not been received from the majority of the plurality of nodes, waiting until a vote has been received from the majority of the plurality of nodes before generating the first content object.

7. The computer system of claim 1, wherein the method further comprises:
- in response to receiving the second interest, determining whether an acknowledgment of an acknowledgment of the vote for the value has been received from the majority of the plurality of nodes;
- upon determining that an acknowledgement has not been received from the majority of the plurality of nodes, waiting until an acknowledgement has been received from the majority of the plurality of nodes before generating the second content object.

8. The computer system of claim 1, wherein the coordinator is selected from a node of the plurality of nodes based on a current round number.

9. A computer-implemented method performed by a computer system that operates as a coordinator for facilitating synchronization via consensus between a plurality of nodes in a content centric network using interests and content objects to communicate between the plurality of nodes, the plurality of nodes associated with a group prefix for routing in the content centric network, the method comprising:
- receiving a first interest that includes a name and a payload, wherein a name in the content centric network is a hierarchically structured variable length identifier comprising contiguous name components ordered from a most general level to a most specific level, wherein the name of the first interest indicates a vote and a round number, and wherein the payload of the first interest includes a value associated with the group prefix;
- in response to receiving the first interest, and in response to receiving a vote for the value from a majority of the plurality of nodes, generating a first content object that includes a name and a payload, wherein the name of the first content object indicates an acknowledgment of the vote, wherein the acknowledgement indicates that a majority of the plurality of nodes have submitted a vote for a value that is the same as the value indicated in the first interest, and wherein the payload of the first content object includes a nonce validator;
- in response to receiving a second interest that indicates an acknowledgment of the first content object, and in response to receiving an acknowledgment of an acknowledgment of the vote for the value from the majority of the plurality of nodes, generating a second content object that includes a payload and a name that indicates a decision for the value, wherein the decision indicates that a majority of the plurality of nodes have submitted an acknowledgment of the first content object, and wherein the payload of the second content object includes a nonce which is used as a pre-image of the nonce validator; and
- determining that the decision for the value indicated by the vote is a valid decision determined by consensus of the plurality of nodes, thereby achieving synchronization via consensus among the plurality of nodes in the content centric network.

10. The method of claim 9, wherein generating the first content object further comprises:
generating a nonce based on a random method; and
performing a hash on the nonce to obtain the nonce validator.

11. The method of claim 9, further comprising:
receiving a third interest that indicates a negative acknowledgment of the second interest.

12. The method of claim 9, further comprising:
in response to receiving the first interest, generating a marker content object that has a payload which includes a future name for a content object that will correspond to the first content object; and
in response to receiving a fourth interest with a name that is the future name, generating the first content object.

13. The method of claim 9, further comprising:
in response to receiving the second interest, generating a marker content object that has a payload which includes a future name for a content object that will correspond to the second content object; and
in response to receiving a fourth interest with a name that is the future name, generating the second content object.

14. The method of claim 9, further comprising:
in response to receiving the first interest, determining whether a vote has been received from the majority of the plurality of nodes;
upon determining that a vote has not been received from the majority of the plurality of nodes, waiting until a vote has been received from the majority of the plurality of nodes before generating the first content object.

15. The method of claim 9, further comprising:
in response to receiving the second interest, determining whether an acknowledgment of an acknowledgment of the vote for the value has been received from the majority of the plurality of nodes;
upon determining that an acknowledgement has not been received from the majority of the plurality of nodes, waiting until an acknowledgement has been received from the majority of the plurality of nodes before generating the second content object.

16. The method of claim 9, wherein the coordinator is selected from a node of the plurality of nodes based on a current round number.

17. A non-transitory computer readable medium storing instructions that, when executed by a processor of a computer system that operates as a coordinator for facilitating synchronization via consensus between a plurality of nodes in a content centric network using interests and content objects to communicate between the plurality of nodes, the plurality of nodes associated with a group prefix for routing in the content centric network, causes the processor to perform a method comprising:
receiving a first interest that includes a name and a payload, wherein a name in the content centric network is a hierarchically structured variable length identifier comprising contiguous name components ordered from a most general level to a most specific level, wherein the name of the first interest indicates a vote and a round number, and wherein the payload of the first interest includes a value associated with the group prefix;
in response to receiving the first interest, and in response to receiving a vote for the value from a majority of the plurality of nodes, generating a first content object that includes a name and a payload, wherein the name of the first content object indicates an acknowledgment of the vote, wherein the acknowledgement indicates that a majority of the plurality of nodes have submitted a vote for a value that is the same as the value indicated in the first interest, and wherein the payload of the first content object includes a nonce validator;
in response to receiving a second interest that indicates an acknowledgment of the first content object, and in response to receiving an acknowledgment of an acknowledgment of the vote for the value from the majority of the plurality of nodes, generating a second content object that includes a payload and a name that indicates a decision for the value, wherein the decision indicates that a majority of the plurality of nodes have submitted an acknowledgment of the first content object, and wherein the payload of the second content object includes a nonce which is used as a pre-image of the nonce validator; and
determining that the decision for the value indicated by the vote is a valid decision determined by consensus of the plurality of nodes, thereby achieving synchronization via consensus among the plurality of nodes in the content centric network.

18. The non-transitory computer readable medium of claim 17, wherein the generating the first content object further comprises:
generating a nonce based on a random method; and
performing a hash on the nonce to obtain the nonce validator.

19. The non-transitory computer readable medium of claim 17, further comprising instructions to cause the processor to perform:
receiving a third interest that indicates a negative acknowledgment of the second interest.

20. The non-transitory computer readable medium of claim 17, further comprising instructions to cause the processor to perform:
in response to receiving the first interest, generating a marker content object that has a payload which includes a future name for a content object that will correspond to the first content object; and
in response to receiving a fourth interest with a name that is the future name, generating the first content object.

* * * * *